US012393617B1

(12) United States Patent
Niu et al.

(10) Patent No.: US 12,393,617 B1
(45) Date of Patent: Aug. 19, 2025

(54) DOCUMENT RECOMMENDATION BASED ON CONVERSATIONAL LOG FOR REAL TIME ASSISTANCE

(71) Applicant: Amazon Technologies, Inc., Seattle, WA (US)

(72) Inventors: Wei Niu, Seattle, WA (US); Yi-Hsin Chen, Seattle, WA (US); Daniel Stephen Edmiston, Seattle, WA (US); Tak Chung Lung, Seattle, WA (US); Nicholas Sun, Seattle, WA (US); Sharifa Monawer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 17/958,137

(22) Filed: Sep. 30, 2022

(51) Int. Cl.
    *G06F 16/3329*     (2025.01)
    *G10L 15/08*     (2006.01)

(52) U.S. Cl.
    CPC ......... *G06F 16/3329* (2019.01); *G10L 15/08* (2013.01); *G10L 2015/088* (2013.01)

(58) Field of Classification Search
    CPC   G06F 16/3329; G10L 15/08; G10L 2015/088
    USPC ....................................................... 704/270
    See application file for complete search history.

(56) References Cited

U.S. PATENT DOCUMENTS

| | | | |
|---|---|---|---|
| 9,159,319 B1* | 10/2015 | Hoffmeister | G10L 15/08 |
| 9,953,640 B2* | 4/2018 | Rice | G10L 15/08 |
| 10,127,908 B1* | 11/2018 | Deller | H04L 67/306 |
| 10,366,699 B1* | 7/2019 | Dharia | G10L 25/21 |
| 10,978,209 B2* | 4/2021 | Chiang | G06F 40/30 |
| 11,038,974 B1* | 6/2021 | Koukoumidis | G10L 15/1815 |
| 11,062,702 B2* | 7/2021 | Wood | G10L 15/22 |
| 11,093,533 B2* | 8/2021 | Ezen Can | G06N 5/02 |
| 11,263,249 B2* | 3/2022 | Layton | G06N 3/006 |
| 11,322,138 B2* | 5/2022 | Li | G10L 15/063 |
| 11,817,095 B2* | 11/2023 | Vozila | G10L 15/1815 |
| 11,917,386 B2* | 2/2024 | Dyonisio | G10L 15/16 |
| 11,922,095 B2* | 3/2024 | Meyers | G10L 15/26 |
| 11,972,304 B1* | 4/2024 | Durairaj | G10L 15/1822 |
| 12,079,833 B1* | 9/2024 | Bhow | G06N 5/04 |
| 2003/0236664 A1* | 12/2003 | Sharma | G10L 15/08 |
| | | | 704/251 |
| 2004/0049499 A1* | 3/2004 | Nomoto | G06F 16/3329 |
| 2004/0117185 A1* | 6/2004 | Scarano | H04M 3/2281 |
| | | | 704/254 |
| 2005/0060301 A1* | 3/2005 | Seki | G06F 16/3329 |

(Continued)

*Primary Examiner* — Thuykhanh Le
(74) *Attorney, Agent, or Firm* — Nicholson De Vos Webster & Elliott LLP

(57) ABSTRACT

Techniques for document recommendation based on conversational log for real time assistance are described. A first machine learning module identifies key phrases of a conversational log in real time. The first machine learning module executes multiple machine learning models trained to determine a probability that a portion of a conversation includes a key phrase. A second machine learning module identifies assistance pertaining to the identified key phrases of the conversational log. The second machine learning module executes a machine learning model trained to identify semantic similarity and word matching features of embedding representations of the key phrases and a knowledge base of assistance. The assistance is provided to a user during a conversation in real time.

19 Claims, 14 Drawing Sheets

(56) References Cited

U.S. PATENT DOCUMENTS

| | | | | |
|---|---|---|---|---|
| 2006/0085184 A1* | 4/2006 | Marcus | G10L 15/22 | 704/E15.04 |
| 2006/0116876 A1* | 6/2006 | Marcus | G10L 15/08 | 704/231 |
| 2006/0282414 A1* | 12/2006 | Sugihara | G06F 16/3329 | |
| 2008/0115163 A1* | 5/2008 | Gilboa | G06Q 30/0241 | 704/E15.045 |
| 2009/0182702 A1* | 7/2009 | Miller | G10L 25/48 | 706/60 |
| 2009/0292778 A1* | 11/2009 | Makar | G06F 16/00 | 345/619 |
| 2010/0076843 A1* | 3/2010 | Ashton | G06Q 30/06 | 705/26.1 |
| 2013/0066886 A1* | 3/2013 | Bagchi | G06F 16/3329 | 707/E17.071 |
| 2016/0063995 A1* | 3/2016 | Choi | G06F 3/167 | 704/243 |
| 2016/0077794 A1* | 3/2016 | Kim | G10L 15/20 | 704/275 |
| 2016/0125877 A1* | 5/2016 | Foerster | G10L 15/16 | 704/254 |
| 2016/0295280 A1* | 10/2016 | Zavesky | H04N 21/812 | |
| 2017/0133009 A1* | 5/2017 | Cho | G10L 15/183 | |
| 2017/0243116 A1* | 8/2017 | Takagi | G06N 20/00 | |
| 2017/0249314 A1* | 8/2017 | Sakai | G06F 16/24522 | |
| 2017/0249663 A1* | 8/2017 | Hajiyev | G06Q 30/0269 | |
| 2017/0287486 A1* | 10/2017 | Civelli | G10L 15/30 | |
| 2017/0323008 A1* | 11/2017 | Makino | G06F 16/353 | |
| 2018/0090139 A1* | 3/2018 | Lester | G10L 15/08 | |
| 2018/0144745 A1* | 5/2018 | Park | H04N 21/266 | |
| 2018/0150747 A1* | 5/2018 | Bastide | G06F 16/3329 | |
| 2018/0232436 A1* | 8/2018 | Elson | G06F 16/3329 | |
| 2018/0308491 A1* | 10/2018 | Oktem | G10L 17/00 | |
| 2018/0324518 A1* | 11/2018 | Dusan | G06F 3/167 | |
| 2019/0005953 A1* | 1/2019 | Bundalo | G06F 1/3287 | |
| 2019/0043494 A1* | 2/2019 | Czyryba | G10L 15/08 | |
| 2019/0188316 A1* | 6/2019 | Huang | G06F 40/20 | |
| 2019/0197106 A1* | 6/2019 | Doggett | G10L 15/22 | |
| 2019/0287518 A1* | 9/2019 | Lee | G10L 15/30 | |
| 2019/0340202 A1* | 11/2019 | Kandur Raja | G06F 40/274 | |
| 2020/0007474 A1* | 1/2020 | Zhang | G09B 7/02 | |
| 2020/0126119 A1* | 4/2020 | Naidu | G06Q 30/0254 | |
| 2020/0142667 A1* | 5/2020 | Querze | G06F 3/165 | |
| 2020/0193973 A1* | 6/2020 | Tolomei | H04R 3/005 | |
| 2020/0243082 A1* | 7/2020 | Yoshida | G06F 16/245 | |
| 2020/0251101 A1* | 8/2020 | Li | G10L 15/30 | |
| 2020/0273447 A1* | 8/2020 | Zhou | G10L 15/148 | |
| 2020/0327197 A1* | 10/2020 | Bhowal | G06N 5/041 | |
| 2020/0410980 A1* | 12/2020 | Yamada | G06F 3/167 | |
| 2021/0005181 A1* | 1/2021 | Abed | G10L 15/285 | |
| 2021/0035561 A1* | 2/2021 | D'Amato | A61M 25/0662 | |
| 2021/0035572 A1* | 2/2021 | D'Amato | G06F 3/167 | |
| 2021/0081442 A1* | 3/2021 | Ganu | G06N 20/00 | |
| 2021/0150146 A1* | 5/2021 | Alexander | G06F 40/30 | |
| 2021/0210075 A1* | 7/2021 | Kim | G10L 15/183 | |
| 2021/0234814 A1* | 7/2021 | Wu | G06F 16/3329 | |
| 2021/0249016 A1* | 8/2021 | Foerster | G10L 15/26 | |
| 2021/0256972 A1* | 8/2021 | Iwata | G06N 20/00 | |
| 2021/0319053 A1* | 10/2021 | Pirovano | G06F 16/345 | |
| 2021/0374141 A1* | 12/2021 | Zhao | G06F 16/24578 | |
| 2021/0407511 A1* | 12/2021 | Wyss | H04M 3/51 | |
| 2021/0407514 A1* | 12/2021 | Laird | G06F 40/30 | |
| 2022/0068272 A1* | 3/2022 | Kwatra | G10L 15/063 | |
| 2022/0075959 A1* | 3/2022 | Kobayashi | G06F 16/3329 | |
| 2022/0115011 A1* | 4/2022 | Sharifi | G10L 15/08 | |
| 2022/0254022 A1* | 8/2022 | Karki | G06T 7/136 | |
| 2022/0261448 A1* | 8/2022 | Kamatani | G06F 16/3329 | |
| 2022/0293097 A1* | 9/2022 | Jekeswaran | G06F 3/167 | |
| 2022/0293109 A1* | 9/2022 | Sharifi | G10L 15/28 | |
| 2022/0343895 A1* | 10/2022 | Tomar | G10L 15/16 | |
| 2022/0375172 A1* | 11/2022 | Meisenholder | G06V 20/60 | |
| 2023/0019982 A1* | 1/2023 | Nakamura | G06F 16/3329 | |
| 2023/0069304 A1* | 3/2023 | Gowda | G06F 16/638 | |
| 2023/0113883 A1* | 4/2023 | Carbune | G10L 15/28 | 704/235 |
| 2023/0169956 A1* | 6/2023 | D'Amato | A61M 25/0662 | 704/275 |
| 2023/0186919 A1* | 6/2023 | Ye | G10L 15/065 | 704/231 |
| 2023/0206288 A1* | 6/2023 | Behara | G06T 19/20 | 705/347 |
| 2023/0206913 A1* | 6/2023 | Vempaty | G10L 15/10 | 704/251 |
| 2023/0252979 A1* | 8/2023 | Fage | G10L 25/21 | 704/257 |
| 2023/0260249 A1* | 8/2023 | Dunay | G06Q 30/0623 | |
| 2023/0267729 A1* | 8/2023 | Bai | G06F 3/0488 | |
| 2023/0267923 A1* | 8/2023 | Chun | G10L 15/1822 | 704/235 |
| 2023/0283496 A1* | 9/2023 | Muchovej | G10L 15/08 | 709/204 |
| 2023/0360640 A1* | 11/2023 | Asi | G06F 40/35 | |
| 2024/0005101 A1* | 1/2024 | Mitsui | G06F 16/24522 | |
| 2024/0054999 A1* | 2/2024 | Tseng | G10L 15/08 | |
| 2024/0098315 A1* | 3/2024 | Sethia | H04N 21/8405 | |
| 2024/0127259 A1* | 4/2024 | Geng | G06Q 30/0201 | |
| 2024/0221743 A1* | 7/2024 | Wei | G10L 25/63 | |
| 2024/0412724 A1* | 12/2024 | Cheng | G10L 25/51 | |

* cited by examiner

| Turn Number | Participant ID | Content | Intermediary Label | Binarized Label |
|---|---|---|---|---|
| 1 | AGENT | Hi, thank you for calling. | 0 | 0 |
| 1 | AGENT | How can I help you? | 0 | 0 |
| 2 | CUSTOMER | Hi, I'm having trouble with my widget. | 2 | 1 |
| 2 | CUSTOMER | It doesn't seem to be doing widgety. | 1, 2 | 1 |
| 3 | AGENT | I see, let me open up a widget fixer so we can troubleshoot together. | 3 | 1 |

DOCUMENT RECOMMENDATION BASED ON CONVERSATIONAL LOG FOR REAL TIME ASSISTANCE

BACKGROUND

Machine learning (ML) is the study of computer algorithms that can improve automatically through experience and by the use of data. ML algorithms build a model based on sample data, known as training data, in order to make predictions or decisions without being explicitly programmed to do so. ML algorithms are used in a wide variety of applications, such as in medicine, email filtering, speech recognition, and computer vision, where it is difficult or unfeasible to develop conventional algorithms to perform the needed tasks.

Natural language processing (NLP) is an application for ML (and a subfield of artificial intelligence) concerned with the interactions between computers and human language, in particular how to program computers to process and analyze large amounts of natural language data. The goal is a computer capable of understanding the contents of documents, including the contextual nuances of the language within them. The technology can then accurately extract information and insights contained in the documents as well as categorize and organize the documents themselves.

BRIEF DESCRIPTION OF DRAWINGS

Various examples in accordance with the present disclosure will be described with reference to the drawings, in which:

FIG. 2 illustrates an example of labeled training data, in accordance with one or more embodiments.

DETAILED DESCRIPTION

Figure 1:
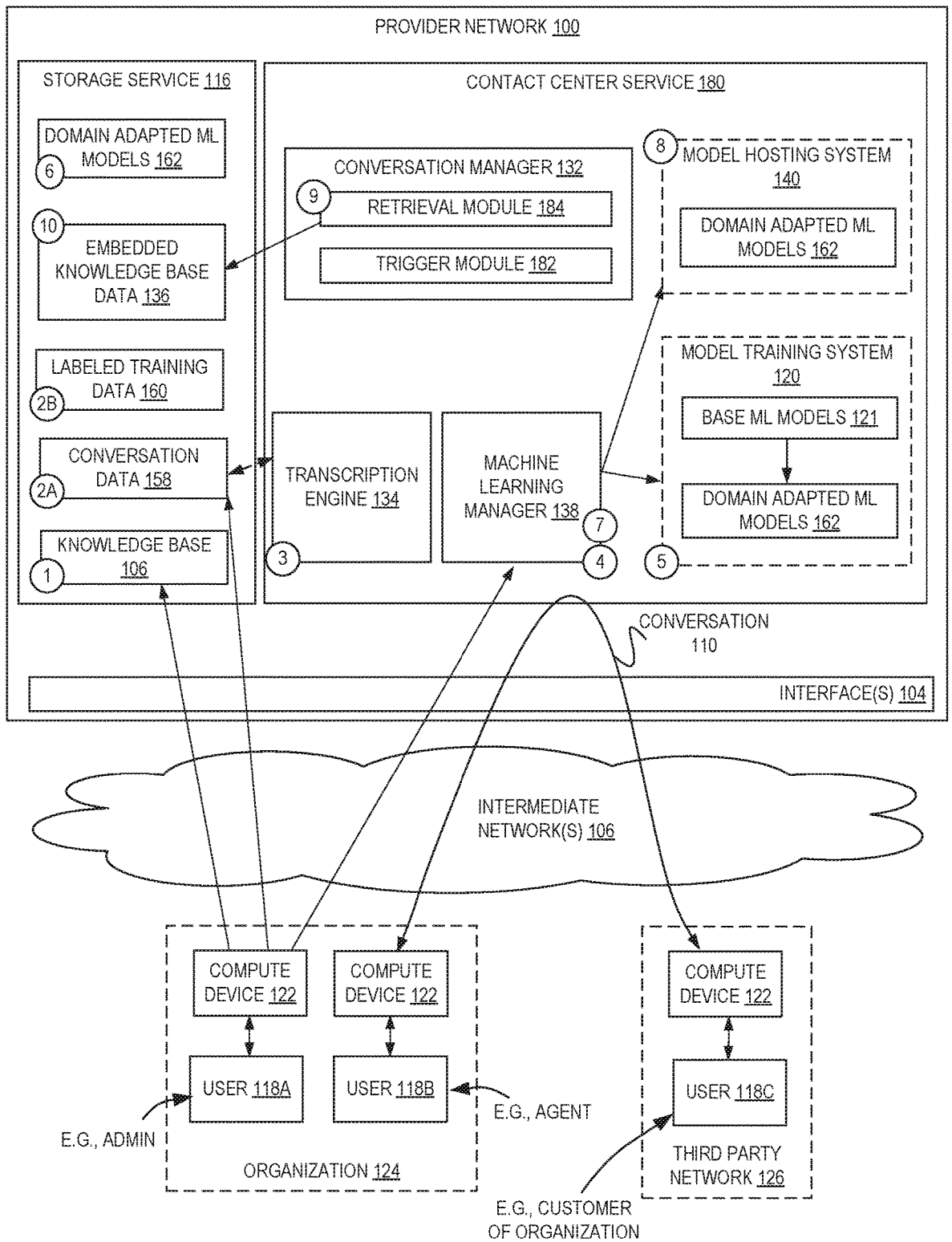
FIG. 1 illustrates configuring an environment for detecting a user's needs and providing real time assistance, in accordance with one or more embodiments.

The present disclosure relates to methods, apparatus, systems, and non-transitory computer-readable storage media for document recommendation based on conversational logs for real time assistance. According to some embodiments, a contact center service providing contact center functionalities provides assistance to agents during conversations by intelligently determining when to recommend assistance and separately determining what assistance to provide. Embodiments described in the present disclosure apply domain-specific machine learning (ML) models to learn relevant portions of a conversation that trigger assistance and identify relevant assistance information (e.g., documents, articles, phone numbers, website addresses, physical addresses, contact information, etc.). Accurately triggering the need to provide assistance (e.g., when to provide assistance to an agent) and the identification of relevant assistance information (e.g., what assistance to provide to an agent) reduces computing resources required by a system and beneficially provides superior chat assistance in the form of relevant recommended subject matter at relevant time(s) in the conversation.

In particular, identifying relevant assistance at relevant times shortens a duration of a conversation, freeing up both computing resources (e.g., bandwidth, processing time, memory, power, etc.) and human resources (e.g., agents that can perform different tasks). For example, an agent (e.g., a first user) that is presented with relevant assistance at a relevant time during a voice conversation with a customer (e.g., a second user) can swiftly address the customer's needs and answer a next call (e.g., a conversation with a third user). In this manner, ML models are conservatively executed, reducing the expenditure of wasteful resources. Moreover, resources are conserved by swiftly addressing subsequent customers, resulting in reducing any resource required to manage a queue of customers.

Traditional systems, however, lack the capability to reliably identify portions of a conversation triggering assistance. In these systems, assistance may not be triggered enough, leaving an agent in need of assistance, or alternatively, too much assistance is provided, flooding the agent with irrelevant information. Thus, traditional systems are unable to provide timely and relevant assistance recommendations.

Further, such systems may utilize ML models (or other algorithms) but these models are excessively executed because naive contact center type systems (1) provide unnecessary assistance to an agent by providing assistance too often or not often enough and (2) provide unhelpful assistance by providing irrelevant assistance. Providing irrelevant/unnecessary assistance consumes wasteful computing resources such as bandwidth, power, etc. For example, an agent may request additional assistance in response to receiving irrelevant assistance, resulting in the re-execution of one or more ML models. Moreover, providing irrelevant assistance consumes unnecessary computing resources by prolonging a conversation between users (e.g., a customer service agent and a customer). For example, it may take longer to end a conversation between users if one user is struggling to provide information to another user (e.g., the customer service agent is not assisted and does not have answers/information to provide to the customer). Prolonged conversations waste both computing resources and human resources as such resources are occupied until the conversation is over.

FIG. 1 illustrates configuring an environment for detecting a user's needs and providing real time assistance, in accordance with one or more embodiments. The illustrated environment includes a provider network 100 hosting a set of services (e.g., a contact center service 180 such as Amazon Connect™) that allow for automatic detection of a user's needs (e.g., issue detection) and a recommendation of a solution in real-time. The environment also includes one or more storage services 116 and may include the use of a machine learning service (e.g., Amazon SageMaker™ providing a model hosting system 140 and/or model training system 120). Each of the one or more storage services 116, contact center service 180, and/or machine learning service may be implemented via software, hardware, or a combination of both, and may be implemented in a distributed manner using multiple different computing devices.

A provider network 100 (or, "cloud" provider network) provides users (e.g., agents and/or admins) with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100, indicated by user 118A and user 118B of organization 124, can use one or more user accounts that are associated with a customer account, though these terms can be used somewhat interchangeably depending upon the context of use. Users (e.g., users 118A and users 118B) can interact with a provider network 100 across one or more intermediate networks 106 (e.g., the internet) via one or more interface(s) 104, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

One type of service that a provider network may provide may be referred to as a "managed compute service" that executes code or provides computing resources for its users in a managed configuration. Examples of managed compute services include, for example, an on-demand code execution service, a hardware virtualization service, a container service, or the like. In various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

As described herein, the provider network 100 includes several services and systems that are used by a contact center service 180 to build, train, and deploy ML models that are executed to detect a user need (such as a customer service agent and/or a customer) and provide real time assistance. Generally, a contact center service 180 manages and executes computing resources to provide services used for a communication between multiple users, such as customers of an organization (e.g., user 118C) and representatives of the organization (e.g., user 118B, a customer service agent). For example, the contact center service 180 can implement an omnichannel cloud contact center that allows for the rapid creation of a virtual contact center that can be used by agents to communicate and engage with customers, record calls and/or generate chat transcripts, perform call monitoring and supervision, perform caller authentication, create and assign tasks to agents, implement custom flows that control how a communication occurs, provide "bot"-based chat agents, etc. For example, in some embodiments a contact center service 180 provides text-based and/or voice-based contact (e.g., telephony) between agents and customers, which may be configured based on agent and/or customer preferences, estimated wait times, etc. In some examples, the contact center service 180 can allow users (such as customer service agent 118B) to assign tasks to themselves or other users of organization 124 (e.g., based on user-requested needs), and may integrate with other enterprise applications or cloud provider network services, such as by storing chat logs, recordings, or transcripts in a storage service, accessing a customer database to keep track of customer contacts, analyze usage data in an analytics service, or the like. In some embodiments, the contact center service 180 can provide personalized support. For example, the contact center service can provide a user interface to each user (such as a customer service agent), such as that illustrated in FIG. 9 and FIG. 10 described herein. In some examples, the contact center service 180 can provide assistance recommendations to users via the user interface, for example, to assist an agent in finding relevant information that may satisfy a customer's question.

In some embodiments, a conversation manager 132 of the contact center service 180 manages and monitors resources used for communications between users (e.g., customer service agents and customers). The conversation manager 132 utilizes a trigger module 182 to identify a trigger (e.g., when a user needs assistance) and, when necessary, a retrieval module 184 to retrieve assistance based on the user's needs. As described with reference to FIGS. 3, 4, 6 and 7, the trigger module 182 and retrieval module 184 each employ ML models (e.g., domain adapted ML models 162) to perform different tasks. The trigger module 182 and retrieval module 184 use different base ML models 160 and/or train the base ML models 160 differently. The training and deployment of the trigger module 182 and retrieval module 184 is described herein.

A transcription engine 134 of the contact center service 180 manages and executes services used for processing (e.g., reformatting, error correcting, etc.) a transcription (or other conversational log) of the communication between users (such as user 118B and user 118C, which may respectively be a customer service agent and a customer). A machine learning manager 138 of the contact center service 180 manages the training and deployment of ML models. As shown, the machine learning manager 138 calls a model training system 120 to manage and execute services used for training ML models. The machine learning manager 138 also calls a model hosting system 140 to manage and execute services used for executing ML models. In other embodiments, the machine learning manager 138 is configured to perform the services of the model training system 120 and/or the model hosting system 140.

As shown at circle (1), a user 118A (such as an admin) operating a compute device 122 uploads a knowledge base 106 to the storage service 116. A compute device 122 is any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The user 118A (e.g., an admin) uploading the knowledge base 106 is associated with organization 124. For example, user 118A may be an administrator of an enterprise (such as a corporation or other organization), and user 118B may be an employee of the enterprise who acts as a customer support representative or agent of the enterprise. While only organization 124 is shown, it should be appreciated that the provider network 100 may communicate with multiple organizations 124 to service multiple enterprises.

The knowledge base 106 stored in the storage service 116 can be a data structure or collection storing enterprise-specific data. For example, the knowledge base can include one or more of articles, guides, solutions manuals, common questions and answers, contact information (e.g., email addresses, telephone numbers), website addresses, physical addresses, templates (e.g., email templates, letter templates, memo templates, etc.) and the like associated with some aspect of the enterprise. For example, an enterprise producing widgets may upload (as part of the knowledge base 106) a widget instruction manual.

At circle (2A), a user 118 (e.g., an admin user 118A) operating the compute device 122 uploads (or identifies) historic conversation data (e.g., conversation logs) between users of the organization 124 (e.g., customer service agent 118B) and users of one or more third party networks 126 (e.g., customer 118C). The uploaded conversation data 158 can be stored at a storage location provided by storage service 116, and the user (such as admin user 118A) may upload this data to the storage location or identify the storage location as holding the conversation data, such as when it has been generated or collected by other users (such as customer service agents 118B) or systems. An example conversation, as shown at 110, is between an agent (e.g., user 118B) and a customer (e.g., user 118C). This particular conversation is a communication between user 118B and user 118C with reference to some aspect of an enterprise (e.g., a widget, a service, etc.), and may have been initiated by the customer (user 118C) initiating a telephone or online voice call to a number or endpoint associated with the contact center service 180. Thereafter, the communication may be "routed" between the agent and customer's compute devices 122 through the contact center service 180 (and thus, via the provider network 100), though in some examples a direct connection may also be used (e.g., directly between the compute devices 122 of the users 118B/118C), whereby data of the conversation can be otherwise provided back to the contact center service 180.

A conversation (e.g., conversation 110) is defined as an iterative interaction between at least two users (e.g., customer service agent user 118B and customer user 118C). Although the conversation may occur between users using voice, text, gestures, etc., in this example the conversation data at circle (2A) is a transcript of the conversation. In some embodiments, the provider network 100 (or user 118B) makes use of one or more ML systems or services, such as Amazon Connect Lens™ or Amazon Transcribe, to transcribe conversation data (e.g., audio and/or video data) into text data. For example, the agent user 118B may upload audio data that is converted to a textual transcript by a transcription service. In other embodiments, the user 118A (such as an admin) uploads a transcript of the conversation.

In some implementations, the conversation data (e.g., transcript) is parsed. For example, the uploaded transcript can be parsed into "turns" of the iterative interaction. Each turn is an interaction of the conversation, such as block of speech communicated by one of the participants (e.g., user 118B or user 118C). In other implementations, the provider network 100 calls the transcription engine 134 of the contact center 180 to parse the transcript. At circle (3), the transcription engine 134 parses the conversation transcript into turns. In some embodiments, the transcription engine 134 is configured to identify participants using any suitable speaker recognition technique and partition successive text associated with the participant into a turn. Participants can be differentiated by the transcription engine 134 using identifiers such as such as "customer", "agent", IP addresses, telephone numbers, etc.

The transcription engine 134 can be further configured to partition each turn. For example, each turn may be further parsed into sentences, words, and the like. For ease of description, a turn is described as being partitioned into an utterance, which is a string of text whose length is based on a sentence (or a complete thought). However, it should be appreciated that a turn may be partitioned into words, multiple sentences, or other portions of a conversation. Additionally or alternatively, an utterance may be defined as a single word or multiple sentences. The parsed transcript may be stored as conversation data 158 in the storage service 116 in addition to the original transcription. In some embodiments, the parsed transcript replaces the conversation data 158 stored in the storage service 116.

Additionally or alternatively, a user (e.g., user 118A, acting as an administrator) uploads (or identifies) labeled training data 160 at circle (2B) using the compute device 122. Labeled training data 160 is used to train one or more ML models, as described herein. The uploaded labeled training data 160 is stored in storage service 116. Labeled training data 160 includes training data with associated input-output pairs. An input-output pair is an input with an associated known output (e.g., a labeled output). For example, an input of the training data is an utterance (or a turn, a sentence, or some other portion of a conversation). A labeled output of the training data includes a label associated with the training input (e.g., whether the training input is a key phrase of the conversation, otherwise referred to herein as a trigger utterance). Such labeled training data 160 may be based on parsed transcript data. FIG. 2 illustrates an example of training data 158 stored in storage services 116.

FIG. 2 illustrates an example of labeled training data, in accordance with one or more embodiments. As shown, by column 206, the content of the training data has been partitioned into sentences, where each sentence is associated with a turn number in column 202. The turn numbers can be used to identify the sentences communicated by a participant in a single turn. For example, turn "1" includes two sentences 216 spoken by the agent. The training inputs 230 are associated with a corresponding label (e.g., a labeled output). The labels can be intermediary labels, indicated in column 208 and/or binarized labels, indicated in column 210.

Training inputs 230 can include a turn number (indicated by column 202), a participant ID (indicated by column 204), and/or content (indicated by column 206). Training inputs 230 can also include additional information such as a token ID (not shown), a turn number of the number of turns to be classified (not shown), a timestamp (not shown), a previous turn which serves as context (e.g., at least two rows such as rows indicated by 216), and the like.

In a non-limiting example, a training input to an ML model can include "[AGENT] Hi, thank you for calling. How can I help you? [September] [CUSTOMER] Hi, I'm having trouble with my widget. It doesn't seem to be doing widgety." In the non-limiting example, two sentences are included in the first turn (indicated by 216), and two sentences are included in the second turn (indicated by 226). The first turn is prepended to the turn of interest (turn 2) separated by token [September]. Moreover, in the example, participant identifier tokens (e.g., [AGENT] and [CUSTOMER]) are prepended to each turn to indicate a speaker. In some implementations, a token-type ID (not shown) is added to a token to indicate whether the token belongs to the turn of interest or a previous turn/subsequent turn.

The labeled outputs 208 and 210 (e.g., manually labeled by one or more users/administrators and/or determined by one or more ML services of the provider network 100), identify whether the training input 230 includes a driver. A driver is an intent associated with a user (such as a customer and/or customer service agent). A driver can be identified at one or more points in a conversation in which a user benefits from assistance (or is seeking assistance). Drivers are identified by identifying content in a conversation that is associated with assistance (e.g., a trigger for assistance). Thus, drivers indicate a need for assistance, a type of assistance, and/or identify information pertaining to assistance. Drivers can also identify products (e.g., particular products, product lines, etc.) and/or services, and various actions, such as agent remediation actions.

For instance, a driver identifies a particular widget at issue (e.g., a particular widget that a customer needs assistance with) and/or an action item associated with a user. For example, a user (such as a customer service agent or other agent) may communicate in a conversation that the user will follow up in an email, in which case the phrase "follow up in an email" is a driver in the conversation. Alternatively, a user (such as an agent) may communicate in a conversation that the user will issue a refund, in which case the phrase "issue a refund" is a driver in the conversation. As described herein, the portion of the conversation including the driver is considered the "trigger" (e.g., trigger utterances, trigger sentences, trigger words, etc.) The conversation may include multiple drivers, and a driver of the conversation may be spoken by any speaker (e.g., a customer service agent, a customer, etc.) An utterance including a driver (e.g., an intent of a speaker such as a need for assistance, a type of assistance, a product, a remediation action, etc.) is considered a trigger utterance.

An utterance is either a trigger utterance or not a trigger utterance. Accordingly, the labeled outputs at 210 are binarized labels. An utterance labeled with a "1" indicates (1) an issue/request that a user (such as a customer) is calling about, (2) a specific product and/or service, and/or (3) a description action that a user (such as a customer service agent) may take in remediation of a customer's issue/request. Utterances that are not trigger utterances are labeled with a "0." For example, the utterance "Hi, thank you for calling" does not (1) indicate an issue/request, (2) indicate a specific product/service, or (3) describe an action that a user (such as a customer service agent) is taking in remediation of a request. Accordingly, the utterance is not a trigger utterance and is labeled with a "0."

In some embodiments, labeled training data 160 includes one or more intermediary labels, as shown in column 208. As shown, an intermediary label "0" identifies utterances that are not trigger utterances. Intermediary label "1" identifies utterances that describe an issue/request that a user (such as a customer) is calling about. Intermediary label "2" identifies utterances that mention a specific product and/or service. Intermediary label "3" identifies utterances that describe an action that a user (such as a customer service agent) may take in remediation of a customer's issue/request. In response to receiving intermediary labels, the machine learning manager 138 (or other component of the contact center service 180 and/or provider network 100) maps the intermediary labels into binarized labels. In the example, any intermediary label that is not "0" is mapped to "1" (as shown in column 210), and any intermediary label that is mapped to "0" is kept as "0."

Referring back to FIG. 1, in some embodiments, the user 118A (such as an admin) uploads conversation data 158 at circle (2A) using the compute device 122, and the provider network 100 makes use of one or more ML services, such as a labeling service like Amazon SageMaker Ground Truth™, to label the conversation data 158. The labeled training data 160 is stored in storage service 116 at circle (2B). In yet other embodiments, the user 118A (such as an admin) uploads conversation data 158 at circle (2A) using the compute device 122, the transcription engine 134 parses one or more transcripts into utterances at circle (3), and one or more ML services such as Amazon SageMaker Ground Truth are used to label the parsed conversation data 158. The labeled training data 160 is stored in storage service 116 at circle (2B).

At circle (4), the user 118A (such as an admin) using the compute device 122 issues one or more requests (e.g., API calls) to the machine learning manager 138 of the contact center service 180 that indicate the user's 118A desire to train base ML models 121 into domain adapted ML models 162. For example, the model training system 120 uses the enterprise specific data uploaded by an admin such as user 118A (e.g., knowledge base 106 data, conversation data 158, and/or labeled training data 160) to tune the base ML models 121 to domain adapted ML models 162. The request may include one or more of an identifier of a storage location storing the conversation data 158, the labeled training data 160, and/or the knowledge base 106. The identifier of the storage location may identify a storage location (e.g., via a Uniform Resource Locator (URL), a bucket/folder identifier, etc.) within the provider network 100 (e.g., as offered by a storage service 116). In some embodiments, the request includes the conversation data 158, the labeled training data 160, and/or the knowledge base 106.

Responsive to receipt of the request, the machine learning manager 138 of the contact center service 180 is invoked and begins operations for training the base ML models 121. For example, at circle (5), the machine learning manager 138 calls the model training system 120 to train base ML models 121, tuning the base ML models 121 into domain adapted ML models 162. The model training system 120 may train different ML models differently depending on the use of the ML models. For example, ML models executed by the trigger module 182 are trained differently than the ML models executed by the retrieval module 184.

In operation, the model training system 120 trains base ML models 121 using a pre-train, domain adapt, and fine-tune paradigm for use in the trigger module 182 and the retrieval module 184. In such a paradigm, the base ML models 121 are ML models trained on domain neutral data (e.g., any publicly available data) and subsequently trained on enterprise/domain specific data (e.g., knowledge base 106, labeled training data 160) to adapt the base ML model to a particular domain. Accordingly, the model training system 120 retrieves such enterprise specific data from the storage service 116 (e.g., the labeled training data 160, assistance information from the knowledge base 106). A domain may be defined as a general area (e.g., retail, medicine, etc.), or a specific enterprise (e.g., retail corporation A, retail corporation B, retail corporation C). Accordingly, the ML models may be executed in general areas or with respect to specific enterprises. The model training system 120 may be a service provided by the contact center service 180 or a different service provided by the provider network 100.

Figure 3:
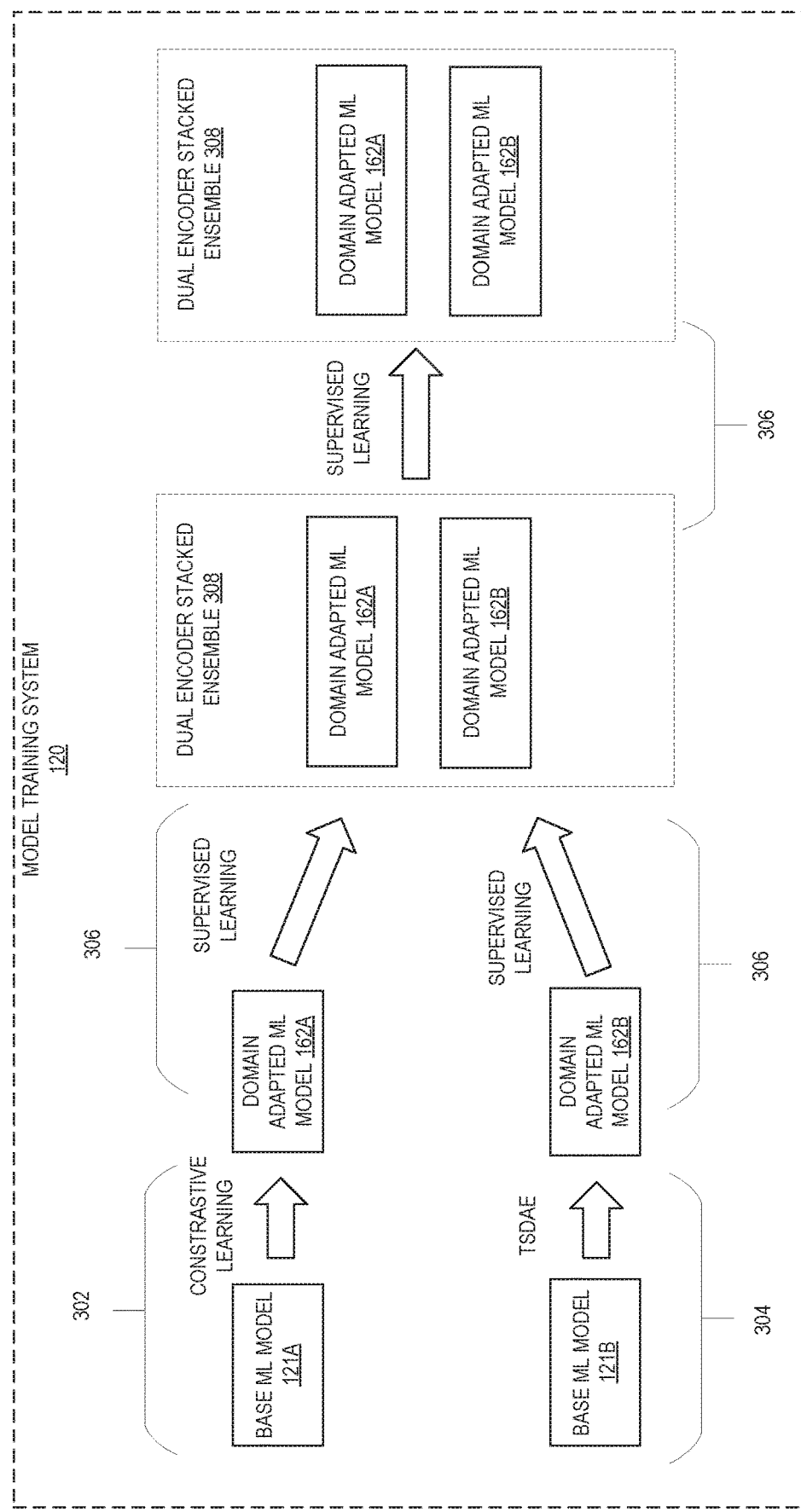
FIG. 3 illustrates an example of the model training system training machine learning models for use in a trigger module, in accordance with one or more embodiments.

FIG. 3 illustrates an example of the model training system 120 training ML models for use in the trigger module 182 in accordance with one or more embodiments. In some embodiments, one or more base ML models 121 are trained from scratch in that base ML models 121 have not been pretrained. For example, the model training system 120 may train the base ML models 121 using a combination of domain specific data (e.g., labeled data 160 and/or knowledge base 106) and general NLP datasets.

In other embodiments, base ML models 121 are off-the-shelf models that have been pretrained. For example, base ML models 121 may be pre-trained transformer-based sentence encoder models trained to derive sentence embeddings by encoding a sequence of text as a sequence of token embeddings and performing mean pooling on the derived sentence embeddings. In an example implementation, base ML model 121A is a Masked and Permuted Pre-training network (MPNET) model, and base ML model 121B is a ROBERTa model pre-trained to encode sequences via Deep Contrastive Learning for Unsupervised Textual Representations (DeCLUTR) model. ROBERTa stands for Robustly Optimized Bidirectional Encoder Representations from Transformers (BERT) pre-training Approach.

BERT is an open-source machine learning framework for natural language processing (NLP). BERT is designed to help computers understand the meaning of ambiguous language in text by using surrounding text to establish context. BERT is based on Transformers, a deep learning model in which every output element is connected to every input element, and the weightings between them are dynamically calculated based upon their connection.

ROBERTa models optimize the training of BERT architecture to reduce pre-training time. ROBERTa has similar architecture to BERT, but includes some design changes in its architecture and training procedure, including removing the Next Sentence Prediction (NSP) objective, training with bigger batch sizes and longer sequences, and dynamically changing the masking pattern. In an example implementation, base ML models 121A and 121B are 12-layer transformer encoders with hidden states in 768 dimensions. The ML models 121A and 121B map text to vectors in 768 dimensions.

As shown at 302, one or more ML models (e.g., base ML model 121A, the MPNET model) may be domain adapted using contrastive learning. Contrastive learning is a mechanism of learning that utilizes self-supervised learning to minimize a distance (such as Euclidean distance) between similar samples in an embedding space and maximize a distance between dissimilar samples in the embedding space. Accordingly, an input sample (e.g., an anchor) is compared to a similar sample (resulting in a positive pair) and a dissimilar sample (resulting in a negative pair). Such pairs are called anchor-positive pairs and anchor-negative pairs respectively, and can be determined using unlabeled data (e.g., in a self-supervised manner). The base ML model 121A learns features of utterances (or turns) that are associated with the meaning of the utterances (or turns) such that the base ML model 121A is able to predict a relationship between pairs of utterances. Learning relationships between pairs of utterances provides useful information in deciding whether utterances (or turns) are trigger utterances.

The model training system 120 determines anchor-positive pairs according to any suitable mechanism. For example, the mode training system 120 may determine anchor-positive pairs using the conversational response selection (i.e., a next turn prediction). According to this method, anchor-positive pairs are constructed from successive turns in a conversation (e.g., a turn at time t, and a turn at time t+1), successive utterances (e.g., an utterance with its immediately succeeding utterance), and the like. Using the conversational response selection method assumes that adjacent turns in a conversation result in related responses (e.g., a question and answer format). Thus, the base ML model 121A is trained to associate turns (or utterances) with subsequent turns (or utterances). Accordingly, training the base ML model 121A to predict the next turn results in the model encoding similar semantics. The base ML model 121A determines anchor-negative pairs by randomly selecting utterances (or otherwise selecting such utterances/turns from a conversation).

The model training system 120 may also determine anchor-positive pairs according to mutually reinforced pre-training. At each iteration of training, a machine learning model such as base ML model 121A mines anchor-positive pairs from a document and reinforces the learning at that iteration by training using the mined pairs. According to this method, anchor-positive pairs are determined from a single document.

The model training system 120 may also determine anchor-positive pairs according to any variation of mutually reinforced pretraining such as mutually reinforced pretraining with clustered documents. Before the base ML model 121A mines anchor positive pairs, the base ML model 121A (or other machine learning model/algorithm such as model training system 120) performs any suitable natural language processing algorithm configured to analyze relationships across documents (e.g., latent semantic analysis, latent semantic indexing, etc.) In one implementation, latent semantic analysis is performed to embed such documents and identify relationships of the documents (and the terms contained in the documents). The model training system 120 clusters the documents using connected components of a k-nearest neighbor graph. In some implementations, clustering the documents may result in a skewed distribution of cluster sizes (e.g., the hubness phenomenon, in which a small number of documents are nearest neighbors to a disproportionality large number of documents). In these implementations, the model training system 120 utilizes cross-domain similarity local scaling (CSLS), or any other variant, to establish a range for the nearest neighbors. Subsequently, the base ML model 121A mines anchor-positive pairs from clusters of documents (as opposed to a single document). In this manner, the base ML model 121A is able to mine an increased number of positive candidates for each anchor.

The base ML model 121A learns using one or more loss functions to push similar samples together in embedding space and pull dissimilar images away from each other in the embedding space. Such loss functions can include contrastive loss, triplet loss, lifted structure loss, N-pair loss, angular loss, divergence loss, and the like. In a particular example, the model training system 120 trains base ML model 121A using InfoNCE loss, illustrated in Equation (1) below.

$$L(D) = E_{((a_i,p_i))_{i=1}^{N} \sim D} \left[ \frac{1}{N} \sum_{i=1}^{N} -\log \frac{\exp(\langle e(a_i), e(p_i) \rangle / \tau)}{\sum_{j=1}^{N} \exp(\langle e(a_i), e(p_j) \rangle / \tau)} \right] \quad (1)$$

In Equation (1) above, e(·) refers to a (normalized) sentence encoding model. In some implementations, the sentence encoding model may not be normalized. In the present disclosure, the sentence encoding model is the pretrained sentence transformer MPNET model, or base ML model 121A. The sentence embedding model embeds a sample (e.g., an utterance $a_i$, $p_i$, $p_j$) into a shared embedding space. In Equation (1) above, <·, ·> refers to taking an inner product, and is a parameter that influences an output probability distribution. In particular, t is a non-negative real parameter, referred to as the "temperature," which influences the probability distribution of Equation (1). Anchor-positive pairs ($a_i$, $p_i$) are sampled in batches of size N from dataset D. The InfoNCE loss uses in-batch negatives to minimize the negative log probability of matching an anchor with the corresponding positive sample. Minimizing the loss function encourages the base ML model 121A to maximize the numerator while minimize the denominator.

As shown at 304, one or more ML models (e.g., base ML model 121B, the DeCLUTR model) may be domain adapted using Transformer-based Sequential Denoising Auto-Encoders (TSDAE). TSDAE is a mechanism of learning that uses self-supervised learning to learn sentence representations. An auto-encoder structure consists of an encoder, which encodes an input sentence to embed it, and a decoder, which decodes the sentence to obtain the original input sentence. The autoencoder operates using the encoder and decoder, and compares a corrupted input sentence to the reconstructed input sentence, following encoding and subsequent decoding, to learn how to better encode the input sentence. Once the encoder is trained to encode a sentence into an accurate sentence representation (e.g., a sentence embedding, or a vector representation of the sentence), the encoder is deployed (e.g., in the trigger module and/or retrieval module) and the decoder is discarded. TSDAEs are a mechanism of learning how to recover an input given noise (or other corruptions) by injecting a known input with noise. Training the DeCLUTR model to encode utterances that are robust to noise is advantageous given that conversation data 158 may be noisy. For example, the transcription of conversation data 158 may include mispronounced words, absent words (e.g., the audio was not captured correctly, background noise abstracts words, etc.) grammatical errors, repeated words (stumbling) etc.

The model training system 120 utilizes TSDAE by applying noise to clean conversation data (e.g., conversation data 158). In some embodiments, the noise is deletion noise. The TSDAE learning method trains an encoder (e.g., base ML model 121B/the DeCLUTR model) to encode sentence embeddings and then decode such sentence embeddings using the decoder. The encoder learns to encode inputs (e.g., utterances) in such a fashion that is robust to noise.

In some embodiments, masked language modeling (MLM) may be employed by the model training system 120 to domain adapt one or more ML models. However, MLM is limited in generating reliable sentence representations by the fact that MLM employs token-level training and not sentence level training. Accordingly, domain adapting an ML model using MLM results in sentence representations that are learned without understanding the context of the sentence. In some implementations, ML models trained using MLM are improved using labeled data (e.g., labeled sentence data) such that the sentence representations consider the context of the sentence.

As described herein, the model training system 120 is configured to train the base ML models in a pre-train, domain adapt, and fine-tune paradigm. Fine tuning involves applying a classifier (e.g., a linear classifier, a multi-layer perceptron (MLP) layer) to the domain adapted ML models 162. As shown at 306, the domain adapted ML models 162A and 162B are fine tuned using supervised learning. In some implementations, a MLP layer is applied to the domain adapted ML models 162A and 162B with a hyperbolic tangent function as the activation function. The newly configured ML models are trained using supervised learning, to identify trigger utterances. With reference to the labeled training data 160 described in FIG. 2, the input used to train the domain adapted ML models 162A and 162B during supervised learning is training inputs 230. The output of the domain adapted ML models 162A and 162B is a predicted probability of whether an utterance is (or includes) a trigger utterance.

As discussed herein, the ability of the domain adapted ML models 162A and 162B to identify relationships in utterances (or pairs of utterances) provides the domain adapted ML models 162A and 162B information related to the content/context of the utterances. Accordingly, the domain adapted ML models 162A and 162B learn to identify trigger utterances. The classifier appended to each model classifies the utterance (a turn, a sentence, or some other portion of a conversation) as likely being (or otherwise including) a trigger utterance. In operation, the classifier determines a probability of the utterance (spoken, written or otherwise communicated by any user of the conversation such as a customer or a customer service agent) being (or otherwise including) a trigger utterance. If the probability of the utterance being a trigger utterance satisfies a threshold, then it is assumed that the utterance is (or otherwise includes) a trigger utterance.

Fine tuning one or more ML models involves optimizing one or more hyper-parameters. Hyper parameters can include: a number of top-layers to reset, a number of MLP hidden layers, a MLP dropout parameter, whether or not to use a previous turn and previous utterance of the same turn as context, a batch size, a learning rate, a classification threshold, and the like.

The ML models are fine tuned by optimizing a loss function such as a cross entropy function. Using this loss function, the model training system 120 trains the domain adapted ML models 162A and 162B to minimize the cross-entropy between the output probabilities determined by a ML model (e.g., ML model 162A and 162B respectively) and the ground truth probabilities (e.g., the binarized labels 210, as described in FIG. 2).

Each of the fine-tuned domain adapted ML models 162 are stacked to create a dual encoder stacked ensemble model 308. The domain adapted ML model 162A and 162B each capture complimentary information for the dual encoder stacked ensemble model 308. For example, the fine-tuned domain adapted MPNET and DeCLUTR models (e.g., domain adapted ML model 162A and 162B respectively) are executed to identify trigger utterances and robustly embed sentences respectively.

As shown at 306, the dual encoder stacked ensemble 308 is fine-tuned using supervised learning. As described herein, fine tuning involves applying a classifier (e.g., a linear classifier, a multi-layer perceptron (MLP) layer) to the dual encoder stacked ensemble 308. In operation, the classifier stacked on each individual fine-tuned domain adapted ML model is discarded, and a classifier is added to the output of the dual encoder stacked ensemble 308. That is, the output of each of the domain adapted ML models is concatenated and fed to a classifier of the dual encoder stacked ensemble 308. With reference to the labeled training data 160 described in FIG. 2, the input used to train the dual encoder stacked ensemble 308 during supervised learning is training inputs 230. The output of the dual encoder stacked ensemble 308 is a predicted probability of whether an utterance is a trigger utterance).

The model training system 120 compares the determined probability to a threshold to determine whether the utterance is a trigger utterance. The threshold may be user defined (e.g., by an admin user 118A and/or agent user 118B), or may be a hyper-parameter optimized during fine tuning of the ML model.

Figure 4:
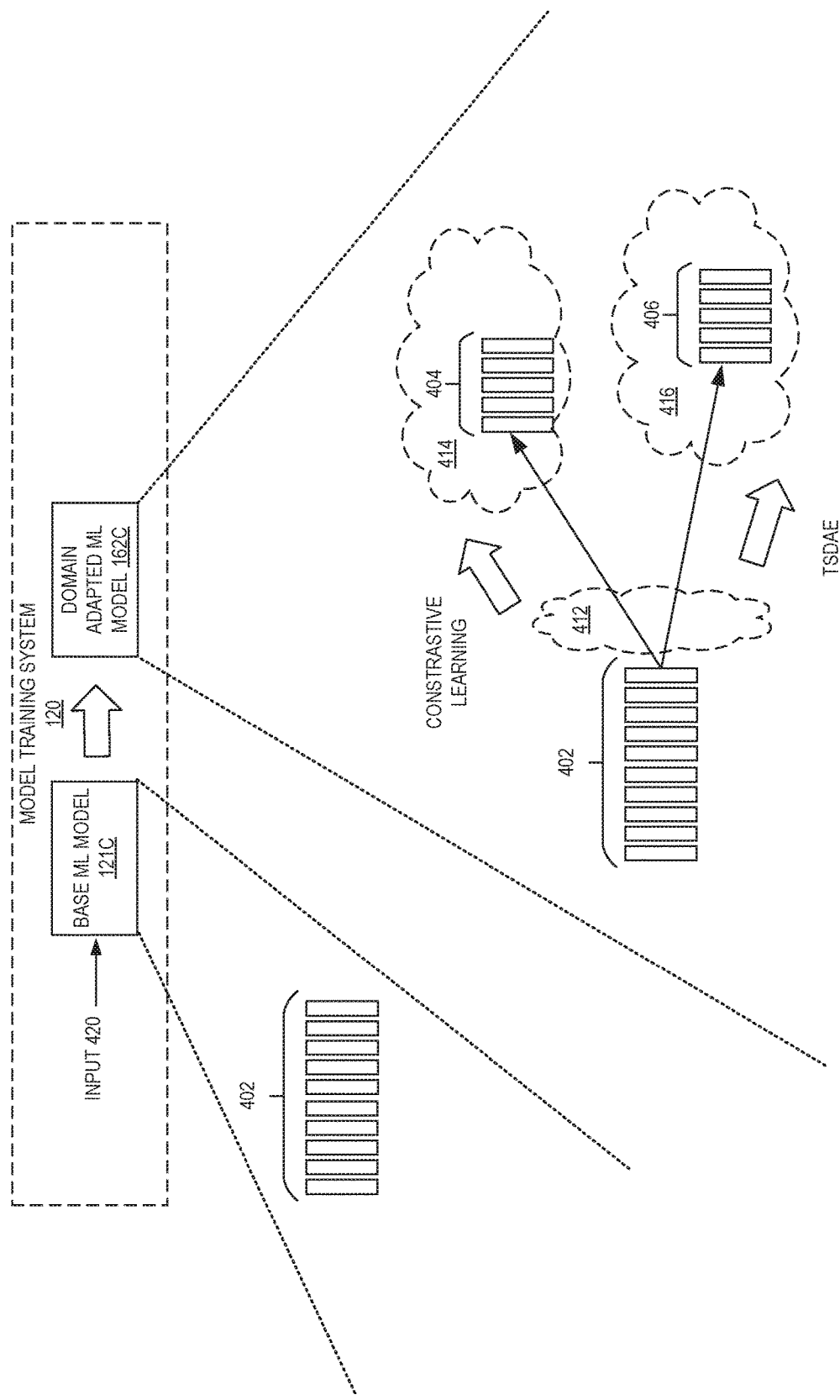
FIG. 4 illustrates an example of the model training system training machine learning models for use in the retrieval module, in accordance with one or more embodiments.

FIG. 4 illustrates an example of the model training system 120 training ML models for use in the retrieval module 184, in accordance with one or more embodiments. In some embodiments, one or more base ML models 121 are trained from scratch in that base ML models 121 have not been pretrained. For example, the model training system 120 may train the base ML models 121 using a combination of domain specific data (e.g., labeled data 160 and/or knowledge base 106) and general NLP datasets. In other embodiments, ML models 121 are off-the-shelf models that have been pretrained.

As shown, the model training system 120 trains a single base ML model 121C as a domain adapted ML model 162C configured to perform the multiple tasks of the retrieval module 184. In other implementations, the model training system 120 trains multiple ML models to perform the multiple tasks of the retrieval module 184.

As described herein, the retrieval module 184 is configured to perform at least two tasks to identify and retrieve relevant assistance information. Multitask learning is when a single ML model is trained to perform multiple tasks. Multitask learning may beneficially prevent the single ML model from being overfitted to each task. A model that is trained using multitask learning includes one or more shared "backbone" layers and "heads" dedicated to perform a specific task. Each head includes the layers of a machine learning model required to perform/learn the specific task associated with that head. That is, each head may utilize a unique loss function to train the particular head to perform a task. Multitask learning improves efficiency as each head receives the same set of features (or other information) determined from the shared portion of the ML model. That is, for a two-headed model, the features received by each head are computed once (e.g., by the shared backbone) instead of twice if each head of the model was its own machine learning model. This efficient sharing is useful in cases where the multitask model learns related tasks. However, sometimes as a performance of one head (a first task) improves, a performance of a different head (a second task) degrades. This results from one or more heads optimizing their task, and negatively affecting the tasks of additional heads (e.g., negative transfer, competition).

FIG. 4 illustrates a multi-headed architecture of the domain adapted ML model 162C used in the retrieval module 184. To prevent negative transfer or other conflict between the heads of the machine learning model (e.g., the two self-supervised tasks), each head creates a task-specific embedding space (e.g., embedding space 414 and embedding space 416) mapped from the shared, general embedding space 412. The loss associated with each task is restricted to the task-specific embedding space to prevent performance competition between the heads.

The shared backbone of the multitask learning model (e.g., the base ML model 121C) is shown as layers 402. The information determined from these layers 402 is shared to both heads 404 and 406. The shared backbone may be any one or more layers, including a BERT model (or other sentence encoder). For example, the BERT base ML model 121C includes one or more layers of a transformer encoder and one or more pooling layers. As described herein, the base ML model 121C is pretrained on domain-neural data to encode an input text into a general embedding space 412 that is shared by the heads 404 and 406. Each head 404 and 406 are task-specific heads consisting of task-specific layers and task-specific loss. Competition is mitigated between heads 404 and 406 because each task-specific head 404 and 406 can learn task-specific embeddings (represented by embedding space 414 and 416 respectively) without directly competing with each other in the shared embedding space (represented by embedding space 412).

As described, each of the heads 404 and 406 are trained to perform a specific task. In some embodiments, the heads 404 and 406 are trained using the same training framework. In other embodiments, each head 404 and 406 is trained according to a unique training framework. For example, head 404 is trained using contrastive learning to learn semantic relatedness, and head 406 is trained using TSDAE to learn a term overlap and enhance robustness to errors.

As described herein, the contrastive learning training framework used to train head 404 involves one or more loss functions to push similar samples together in task-specific embedding space 414 and pull dissimilar images away from each other in the task-specific embedding space 414. Accordingly, an input sample (e.g., an anchor) is compared to a similar sample (resulting in a positive pair) and a dissimilar sample (resulting in a negative pair). The model training system 120 determines positive pairs according to any suitable mechanism. In the present embodiment, it should be appreciated that sentence embeddings received by the base ML model 121C originate from very different domains (e.g., conversations in real time between two users vs assistance information originating from a knowledge base). As such, the model training system 120 beneficially trains head 404 using a variety of positive pairs. For example, positive pairs are extracted from both conversations and assistance information.

For example, the model training system 120 may determine positive pairs using next turn prediction to extract positive pairs from conversation data 158 (or labeled training data 160), as described herein. To extract positive pairs from conversation data 158, the model training system 120 may randomly sample an anchor turn (or utterance), and the next/subsequent turn (or utterance) is determined to be the positive pair. The conversational response selection technique assumes that adjacent turns in a conversation result in related responses (e.g., a question and answer format). Accordingly, training the bas ML model 121C to predict the next turn results in the base ML model 121C encoding similar semantics. In this manner, the model training system 120 generates pairs from a conversation.

The model training system 120 may also determine positive pairs according to independent random cropping, to extract positive pairs from information received from knowledge base 106 (e.g., a document). For example, the model training system 120 determines anchor-positive pairs from a single document (or other text from a knowledge base) by partitioning the document into sections and sampling text from the same section of the document. The sampled text may be one or more sentences, words, paragraphs, and the like. Independent random cropping assumes that text from the same section is semantically similar. In this manner, the model training system 120 generates pairs from a knowledge base.

The training system 120 utilizes a loss function with in-batch negatives and a multi-negative ranking loss objective to train the base ML model 162C. In a particular example, the model training system 120 trains base ML model 121C using the same loss described in Equation (1) above. However, the sentence encoding model is BERT instead of MPNET. The loss function results in a high similarity of positive pairs, and a low similarity of negative pairs.

As described herein, the TSDAE training framework used to train head 406 includes an encoder and decoder to train the encoder to encode an input using unlabeled data. The TSDAE loss is determined by comparing a corrupted input sentence to the reconstructed input sentence, following encoding and subsequent decoding, to learn how to better encode the input sentence. Mathematically, the TSDAE loss is illustrated in Equation (2) below:

$$L(\theta) = E_{x \sim D}[-\log P_\theta(x|\tilde{x})] \quad (2)$$

In Equation (2) above, D is the training data, x is an input sampled from D, $\tilde{a}$ is the corrupted input, and $\theta$ are the model parameters for both the shared backbone 402 and the task-specific head 406. Training the head 406 using the TSDAE framework allows the base ML model 121C to learn to encode features of a corrupted input that support decoding the clean input. In this manner, the training head 406 learns to encode representations that are robust to errors. Moreover, the overlap between the corrupted input and the original input allows the head 406 to learn overlap between inputs. In this manner, the training head 406 learns to identify overlapped terms (e.g., word matching).

In operation, multitask learning is implemented by creating at least two datasets for both the contrastive learning framework (e.g., head 404) and the TSDAE framework (e.g., head 406). A first dataset for each head is that of a communication (e.g., chat transcriptions). The communication (e.g., an utterance derived from a chat transcript) is corrupted by adding deletion noise (or other noise). A second dataset for each head is that of information from a knowledge base (e.g., articles, contact information, documents, etc.). In some embodiments, the fragment module 722 described with reference to FIG. 7, partitions information from the knowledge base into fragments. For example, the fragment module, as described herein, breaks down a document retrieved from a knowledge base into sections (e.g., paragraphs), and each section is further partitioned into fragments using a window of size $W_d$, and a stride of size $S_d$.

During training, at each step a task is chosen, either by random sampling or deterministically. Once a head is chosen, the dataset associated with that head is fed to the ML model and the loss associated with that head updates the domain adapted ML model 162C.

In some embodiments, the domain adapted ML model 162C is fine tuned. The domain adapted ML model 162C may be fine-tuned using labeled training data associating trigger utterances to assistance information. Additionally or alternatively, the domain adapted ML model 162C is fine-tuned using one or more public datasets (e.g., Semantic Textual Similarity (STS), Stanford Natural Language Inference (SNLI), and Multi-Genre Natural Language Inference (MultiNLI)). Fine-tuning the domain adapted ML model 162C using public datasets may improve the embedding representation determined by the domain adapted ML model 162C.

The labeled data associated with the public datasets may be in various forms. For example, given a pair of sentences using the STS dataset, the similarity of the pair of sentences is a score between 0-5. In contrast, given a pair of sentences using the SNLI dataset, the similarity of the pair of sentences is identified based on whether a premise sentence entails a hypothesis sentence, whether the premise sentence contradicts the hypothesis, and/or whether the premise sentence is neutral with respect to the hypothesis. Accordingly, fine tuning the domain adapted ML model 162 using data labeled in different forms requires determining a specific loss function for each form of labeled data. Further, the model training system 120 trains the domain adapted ML model 162 using the loss function associated with the labeled data. For example, for the STS dataset, the domain adapted ML model 162 is fine-tuned using the mean square error loss function. In contrast, for the SNLI dataset (and/or the MultiNLI dataset), the domain adapted ML model 162 is fine-tuned using the multiple negative ranking loss function.

Referring back to FIG. 1, the domain adapted ML models 162 of the trigger module 182 and the retrieval module 184 are stored in the storage service 116 at circle (6). At circle (7), the machine learning manager 138 of the contact center service 180 is invoked to prepare the domain adapted ML models 162 for deployment. At circle (8), the machine learning manager 138 calls the model hosting system 140 to host the domain adapted ML models 162. In the call to the model hosting system 140, the machine learning manager 138 may include an identifier of a storage location of the domain adapted ML models 162 in storage service 116.

In some embodiments, the model hosting system 140 executes one or more domain adapted ML models 162. For example, the model hosting system 140 expends the resources to execute such domain adapted ML models 162. The model hosting system 140 may be a service provided by the contact center service 180 or a different service provided by the provider network 100. Although one model hosting system 140 is shown, multiple model hosting systems 140 may be called to host domain adapted ML models 162. For example, a first model hosting system 140 may be called to host a first domain adapted ML model 162, and a second model hosting system 140 may be called to host a second domain adapted ML model 162.

In other embodiments, one or more services of the contact center service 180 execute the domain adapted ML models 162. For example, at circle (9), the retrieval module 184 of the conversation manager 132 is executed to encode knowledge base data 106. Executing the retrieval module 184 on knowledge base 106 prior to run time (e.g., at a time when two users are actively engaged in a communication in real time) is considered precomputing the knowledge base embeddings.

Precomputing the knowledge base embeddings advantageously reduces latency associated with identifying relevant assistant information during a real time conversation between two users (e.g., user 118C (customers, students, employees) and user 118C (agents, government officials, employees)). In other embodiments, all (or a portion) of the knowledge base data is embedded during the real time conversation between user 118B and user 118C, or at a different predetermined time.

The predetermined time may be defined according to received instructions from a user (such as an admin) associated with organization 124. For example, an admin may determine that the predetermined time is monthly. The predetermined time may also be a standard time across the provider network 100. For example, the provider network 100 may instruct the retrieval model 184 to retrieve knowledge base data 160 bi-annually. In some embodiments, the predetermined time is every day during a time of day in which there is low computing traffic (e.g., between 4:00 am-5:00 am). The retrieval module 184 stores the precomputed embeddings of the knowledge base 136 (e.g., precomputed encoded assistance information) in storage service 116 at circle (10) until run time.

Figure 5:
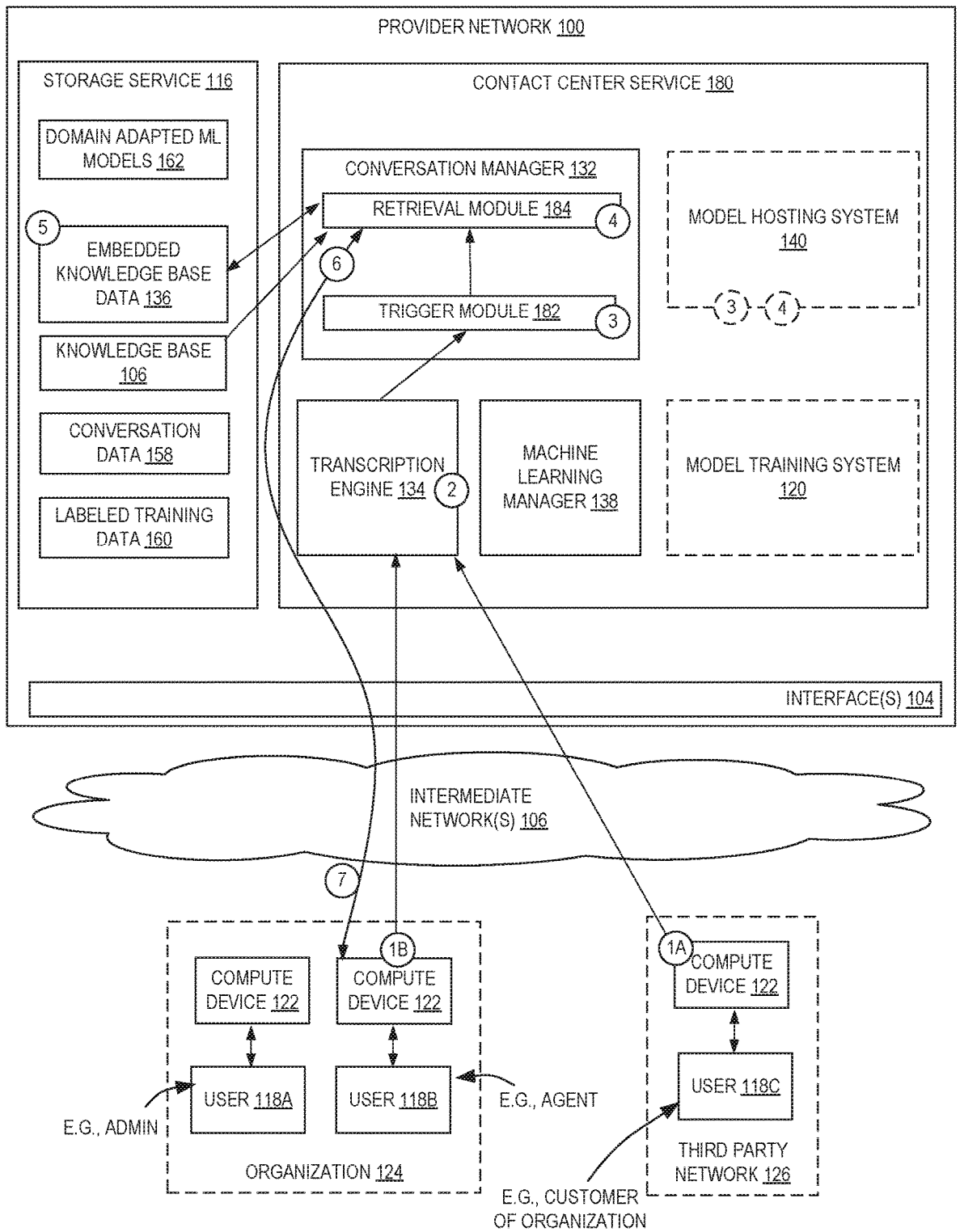
FIG. 5 illustrates the environment of FIG. 1 during deployment (e.g., at run time), in accordance with one or more embodiments.

FIG. 5 illustrates the environment of FIG. 1 during deployment (e.g., at run time), in accordance with one or more embodiments. A user (such as a customer) operating a compute device initiates a communication with another user operating another compute device (such as an agent). For example, user 118C operating a compute device 122 of the third-party network (e.g., a personal network) initiates communication with a user (e.g., user 118B) operating compute device 122 of the organization 124. The communication between users may occur using voice (e.g., telephone call, VOIP), text (e.g., web-based chat, application-based chat), gestures (e.g., video feed via VoIP), and the like. The communication is a conversation between users (e.g., customers and agents) with reference to an aspect of a user of the provider network 100. For example, the user 118B of the provider network 100 may be an agent of a manufacturer that manufactures widgets, and the conversation is related to the manufactured widgets.

In some embodiments, when the user 118C (such as a customer) initiates the communication with user 118B (such as an agent), the organization 124 redirects the communication to the provider network 100. In other embodiments, the organization 100 passes (or forwards) the communication to the contact center service 180 of the provider network 100. In yet other embodiments, the contact center service 180 of the provider network is configured to receive the initiated communication at circle (1A). Subsequently, the contact center service 180 notifies a user (such as agent user 118B) of the organization 124 via compute device 122. A user 118B operating compute device 122 then connects to the contact center service 180 at circle (1B). In this manner, the contact center service 180 receives communication data in real time.

The transcription engine 134 of the contact center service 180 at circle (2) receives the communication data and performs one or more services used for processing. For example, the transcription engine 134 (or other service of the provider network 100) may translate languages, perform automatic speech recognition, correct errors in the communication (e.g., misspellings, mispronunciations, grammatical errors, repeated words (stumbling) etc.) using any conventional one or more algorithms. For example, if the conversation between user 118C (e.g., a customer) and user 118B (e.g., an agent) is a telephone call, the transcription engine 134 executes one or more automatic speech recognition algorithms to reformat the audio data into text data (e.g., a transcript of the conversation, a conversational log). Additionally or alternatively, the transcription engine 134 parses the transcript. The transcript may be partitioned into turns, sentences, words, or any other portion of a conversation.

Partitioning the conversation into smaller blocks of text increases the speed in which the conversation manager 132 processes the text. For example, if the conversation manager 132 receives utterances of the conversation as the utterance is communicated, the conversation manager 132 may identify a need for assistance (e.g., a driver) in the utterance. In contrast, if the conversation manager 132 receives the conversation data at the end of a turn (e.g., after a speaker has finished speaking), the identification of the need for assistance is delayed. Accordingly, waiting for the completion of one speaker in the conversation injects latency into the processing performed by the conversation manager 132. Splitting turns into individual sentences decreases the likelihood of latency issues associated with triggering assistance on full turns. In operation, the transcription manager 134 applies a tokenizer to turn-level data, and aggregates sentences in real time as the turn progresses. In other embodiments, the transcription engine 134 passes raw conversation data to the conversation manager 132.

At circle (3), the trigger module 182 of the conversation manager 132 is configured to receive the conversation data (e.g., raw conversation data, turns of the conversation, utterances of the conversation, and the like). For ease of description, the trigger module 182 is described as receiving an utterance, however it should be appreciated that the trigger module 182 may receive any portion of the conversation data. The utterance is any speaker utterance including a customer utterance and/or a customer service agent utterance, for instance.

The trigger module 182 is configured to evaluate the received utterance(s) and determine whether the utterance(s) trigger assistance. The trigger module 182 provides real time assistance to a user (such as a customer service agent) by identifying trigger utterances in a conversation. Identifying trigger utterances means identifying a speaker intent (e.g., a speaker's need for assistance, a type of assistance, information pertaining to assistance, a product/service, and/or an action). As described herein, the trigger module 182 identifies trigger utterances responsive to identifying a particular widget at issue (e.g., a particular widget that a customer needs assistance with). In another example, the trigger module 182 identifies trigger utterances responsive to identifying an action item associated with a user (such as a customer service agent). For instance, a customer service agent may communicate in a conversation that the customer service agent will follow up in an email, in which case the phrase "follow up in an email" is a driver that indicates that the utterance is a trigger utterance. The trigger module 182 may identify a trigger utterance at one or more points in a conversation in which a user seeks assistance. For example, a customer may seek assistance if the customer mentions a particular product line. The assistance may include a user manual associated with the particular product line. Moreover, an agent may seek assistance if the agent mentions that they will perform a remediation action. The assistance may include a template email or a refund form.

As described herein, a trigger module 182 that triggers assistance too frequently floods a user (such as an agent) with information, decreasing the effectiveness of the assistance. That is, the trigger module 182 is detecting too many trigger utterances. In contrast, a trigger module 182 that triggers assistance too infrequently does not provide a user (such as an agent) with assistance when the user needs help. That is, the trigger module 182 is not detecting enough trigger utterances.

In operation, the trigger module 182 encodes the received utterances (e.g., from the transcription engine 134) into high-dimensional continuous space (as vectors), which are subsequently fed to a classifier. As described herein, the text is embedded via fine-tuned domain adapted ML models 162. The trigger module 182 makes a binary determination (e.g., the utterance is a trigger utterance, or the utterance is not a trigger utterance) based on one or more received utterances.

Figure 6:
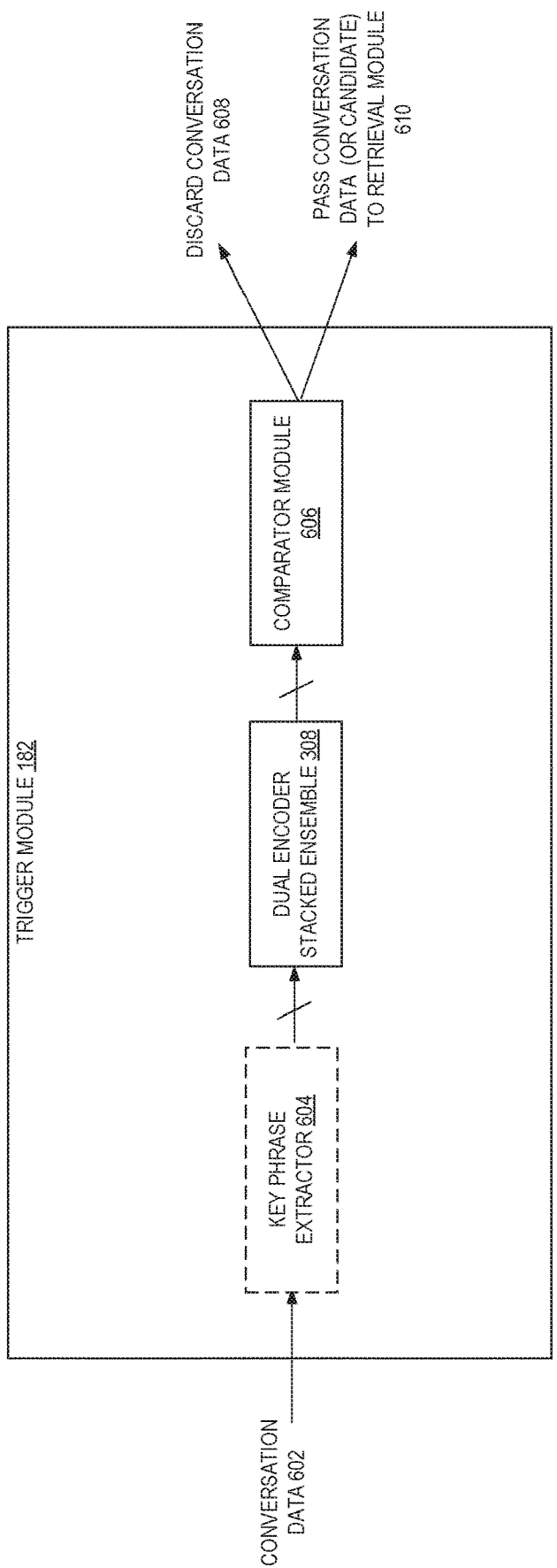
FIG. 6 is a block diagram of a deployed trigger module, in accordance with one or more embodiments.

FIG. 6 is a block diagram of a deployed trigger module 182, in accordance with one or more embodiments. The trigger module 182 includes the dual encoder stacked ensemble 308, described with reference to FIG. 3, trained to determine a probability that a conversation input includes a trigger utterance. The trigger module 182 may also include a key phrase extractor (KPE) 604 and a comparator module 606. However, it should be appreciated that such modules (e.g., KPE 604 and comparator module 606) may be implemented by the model hosting system 140, the provider network 100, or some other service. As shown, the trigger module 182 is configured to receive conversation data 602. For ease of description, the conversation data 602 is described as an utterance, but it should be appreciated that the conversation data 602 may be a turn, a sentence, or some other portion of a conversation.

As described herein, the dual encoder stacked ensemble 308 is the machine learning model including both the MPNET ML model trained on enterprise-specific data (e.g., labeled training data 160 and/or conversation data 158) using contrastive learning, and the DeCLUTR model trained on enterprise-specific data using TSDAE. The dual encoder stacked ensemble 308 is trained to learn to predict trigger utterances and embed sentences using each of the ML models of the dual encoder stacked ensemble. The output of the dual encoder stacked ensemble 308 is a probability that the conversation data 602 includes a trigger utterance.

Providing one or more trained ML models (e.g., the dual encoder stacked ensemble 308 of the trigger module 182, the domain adapted ML model 162C of the retrieval module 184) with too much information (irrelevant information) may reduce the performance of the ML models. In some implementations, Key Sentence Extractor (or Key Phrase Extractor) KPE 604 is employed to extract relevant information from the conversation data 602.

The KPE 604 reduces the size of the conversation data 602 processed by the dual encoder stacked ensemble 308 by partitioning the conversation data 602 into one or more candidates using any suitable mechanism. A candidate is a sentence, a fragment of a sentence, one or more utterances, and the like, partitioned from the conversation data 602. In some embodiments, KPE 604 is a machine learning model trained to identify key phrases/fragments of the conversation data 602 (e.g., candidates). For example, KPE 604 may be trained using supervised learning if the model training system 120 is provided with training inputs (e.g., turns in a conversation) and corresponding labeled data (e.g., key information extracted from the turn input). The KPE 604 learns to identify the key phrases of the conversation data 602 and passes such data to the dual encoder stacked ensemble 308. In other embodiments, KPE 604 uses a sentence parser, a sentence tokenizer, and the like, to parse candidates of conversation data 602. For example, KPE 604 partitions a multi-sentence utterance (e.g., conversation data 602) into multiple sentences.

In some embodiments, the KPE 604 partitions the conversation data 602 using a window and stride. A window defines a number of sentences (or words or the like) that are included in a candidate, and a stride defines a number of sentences (or words or the like) that are skipped between consecutive candidates. In some embodiments, the window may be a predetermined window size $W_d$, and the stride may be a predetermined stride size $S_d$. In other embodiments, the window and stride are hyper-parameters that are optimized during training.

The KPE 604 passes as a batch, the one or more candidates derived from the conversation data 602 and the conversation data 602 (e.g., the multi-sentence utterance), to the dual encoder stacked ensemble 308 such that the ensemble model determines a probability of a trigger utterance in the batch input.

In some embodiments, KPE 604 is not executed because the conversation data 602 is a sufficient size for the dual encoder stacked ensemble 308. A sufficient size of conversation data 602 for the dual encoder stacked ensemble 308 may be a predetermined number of bytes, bits, characters, words, and the like. For example, the conversation data 602 may be received by the trigger module 184 as a single sentence. In these embodiments, the conversation data 602 is fed directly to the dual encoder stacked ensemble 308 such that the ensemble ML model determines a probability that the conversation data 602 includes a trigger utterance.

In a non-limiting example, an utterance (e.g., conversation data 602) including four candidates (e.g., candidate sentences) is passed to KPE 604. The KPE 604 may determine the conversation data 602 (e.g., the multi-sentence utterance) is not a sufficient size for the dual encoder stacked ensemble 308. For example, the multi-sentence utterance is not a sufficient size because the utterance includes too many sentences. Accordingly, the KPE 604 partitions the multi-sentence utterance into four sentences. Subsequently, the KPE 604 passes a batch including each of the parsed four candidate sentences and the multi-sentence utterance to the dual encoder stacked ensemble 308. As such, the ensemble model receives a total of five inputs in one batch. The dual encoder stacked ensemble 308 operates on the batch input, determining a probability that each of the four candidate sentences and the conversation data 602 (e.g., multi-sentence utterance) include a trigger utterance. Accordingly, the dual encoder stacked ensemble 308 determines a batch output. The batch output is a probability that each of the four sentences are (or include) trigger utterances, and a probability that the conversation data 602 includes a trigger utterance. The dual encoder stacked ensemble 308 passes the one or more probabilities to the comparator module 606.

The comparator module 606 is configured to compare the one or more probabilities that an utterance (or candidate) includes a trigger utterance to a trigger threshold. In some scenarios, the comparator module 606 receives one probability. For example, the dual encoder stacked ensemble 308 outputs a single probability associated with conversation data 602 because the conversation data 602 is a single sentence, for instance). In these scenarios, the comparator module 606 compares the probability to the trigger threshold. If the probability satisfies the trigger threshold (i.e., meets or exceeds a threshold probability value), then the conversation data 602 is passed to the retrieval module 184 at 610. In other words, if the probability that the conversation data 602 (such as an utterance) satisfies a threshold, then the utterance is considered a trigger utterance. As such, the utterance is passed to the retrieval module 184 to identify assistance information pertaining to the trigger utterance.

On the other hand, if the probability of the conversation data 602 determined by the dual encoder stacked ensemble 308 does not satisfy the trigger threshold, then the conversation data 602 is not passed to the retrieval module 184. The conversation data 602 is discarded at 608. In other words, if the probability that the conversation data 602 determined by the dual encoder stacked ensemble 308 does not satisfy the trigger threshold, then the utterance is likely not a trigger utterance.

In other scenarios, the comparator module 606 receives multiple probabilities. For example, the dual encoder stacked ensemble 308 outputs a batch including multiple probabilities associated with each candidate of the conversation data 602 and the conversation data 602 as a whole. In these scenarios, the comparator module 606 first compares the probability of the conversation data 602 to the trigger threshold. That is, the comparator module 606 does not compare the probabilities of each of the candidate sentences to the trigger threshold. If the probability of the conversation data 602 determined by the dual encoder stacked ensemble 308 satisfies the trigger threshold, then the comparator module 606 compares the probabilities of each of the candidates to each of the other candidates. The comparator module 606 selects a candidate to pass to the retrieval module 184 at 610 based on a highest probability associated with each of the candidate sentences (or a lowest probability). The other candidates that are not selected may be discarded. If multiple candidates receive the same probability from the dual encoder stacked ensemble 308, then the comparator module 606 concatenates each of the candidates and passes the concatenated candidates to the retrieval module 184. On the other hand, if the probability of the conversation data 602 does not satisfy the trigger threshold, then the comparator module 606 does not compare the probability of each of the candidates to each of the other candidates. In this scenario, the comparator module 606 discards the conversation data and each of the candidates at 608.

The trigger threshold is a user-configured parameter that adjusts a frequency of assistance provided to a user (such as an agent). In some implementations, the user-configured parameter is configured by an administrator. In other implementations, the user-configured parameter is configured by an agent. In some embodiments, the trigger threshold is set to a default value of 0.5 (or 50%). In one example implementation, if the trigger threshold is adjusted to be higher than 50%, then the user (such as an agent) will receive less assistance. That is, fewer utterances will satisfy the higher trigger threshold, resulting in fewer utterance being identified as trigger utterances. In contrast, if the trigger threshold is adjusted to be less than 50%, then the user (such as an agent) will receive more assistance. That is, more utterances will satisfy the relaxed trigger threshold, resulting in more utterances being identified as trigger utterances.

Referring back to FIG. 5, at circle (4), the retrieval module 184 receives the conversation data (or a portion of the conversation data such as a candidate) from the trigger module 182.

As described herein, the trigger module 182 is configured to identify trigger utterances (or other portions of the conversation data) where the trigger indicates that the utterance (or other portion of the conversation data) is likely a trigger utterance. In operation, the trigger module 182 acts as a filter, providing only certain utterances to the retrieval module 184. By restricting the utterances passed to the retrieval module 184, the trigger module 182 manages the assistance provided to the user (such as the agent). In this manner, the user is not flooded with assistance information, making the assistance information unhelpful.

The retrieval module 184 is configured to receive an input (e.g., an utterance or other portion of a conversation) and provide assistance information. Examples of assistance information includes documents, articles, phone numbers, website addresses, physical addresses, contact information, template emails, refund forms, (or other documents), etc. that are highly relevant to a trigger utterance in the input. In a non-limiting example, responsive to receiving an utterance identifying a specific product, the corresponding assistance information includes an instruction manual for the specific product.

The assistance information is retrieved from an enterprise specific knowledge pool (e.g., knowledge base 106). At circle (5), the retrieval module 184 receives the precomputed embedded knowledge base data 136 to obtain embedded assistance information. In other implementations, the retrieval module 184 receives the knowledge base data 106 and encodes one or more portions of the knowledge base to determine embedded assistance information.

In operation, the retrieval module 184 encodes an input (e.g., a trigger utterance), encodes assistance information, and estimates a relevance using a similarity measure between the embedded input and embedded assistance information. As described herein, the assistance information may be embedded at a predetermined time to reduce latency associated with identifying relevant assistance information in real time (e.g., during an ongoing conversation between the two users such as customers/students/employees and agents/employees/government officials). The retrieval module 184 learns utterance representations (e.g., embedded utterances) that not only encode the syntactic and semantic information, but are also robust. A robust utterance representation is a representation in light of speech recognition errors (e.g., a word incorrectly identified because of an incorrect pronunciation during transcription, a word incorrectly identified because of a misspelling) noise, and the like.

As discussed herein, the retrieval module 184 is configured to perform at least two tasks to identify (and retrieve) relevant assistance information. First, the retrieval module 184 is configured to match tokens in an input (e.g., an utterance, a sentence, a turn, etc.) to tokens in assistance information. By matching (e.g., overlapping) words (or phrases) in an utterance with assistance information, there is a high likelihood that the assistance information is related to the utterance. Second, the retrieval module 184 is configured to identify semantically related tokens (or words/phrases). By identifying words (or phrases) in an utterance that are semantically related to words (or phrases) in assistance information, there is a high likelihood that the assistance information is related to the utterance.

As discussed with reference to FIG. 4, a single ML model is trained to perform different tasks using multi-task learning. In this manner, the domain adapted ML model 162C can both identify word overlapping and semantic matching using the same input (e.g., a trigger utterance, assistance information from a knowledge base). As described herein, the retrieval module 184 is a self-supervised system. That is, both learning tasks involved in retrieving relevant documents employ self-supervised training. For example, as described herein, learning word overlapping is accomplished by training the BERT model (e.g., base ML model 121C) using the TSDAE framework, where the TSDAE framework accomplishes learning without supervision. Similarly, learning semantic relevance is accomplished by training the BERT model (e.g., base ML model 121C) using contrastive learning, where contrastive learning accomplishes learning without supervision. The retrieval module 184 beneficially utilizes self-supervised learning tasks (e.g., TSDAE and contrastive learning) such that the retrieval module 184 can be scaled. Using self-supervised learning tasks allows the retrieval module 184 to learn new datasets without labels. Scaling the retrieval module 184 for use with new users (such as enterprises) of the provider network simply involves providing a new knowledge database associated with the new user of the provider network.

Figure 7:
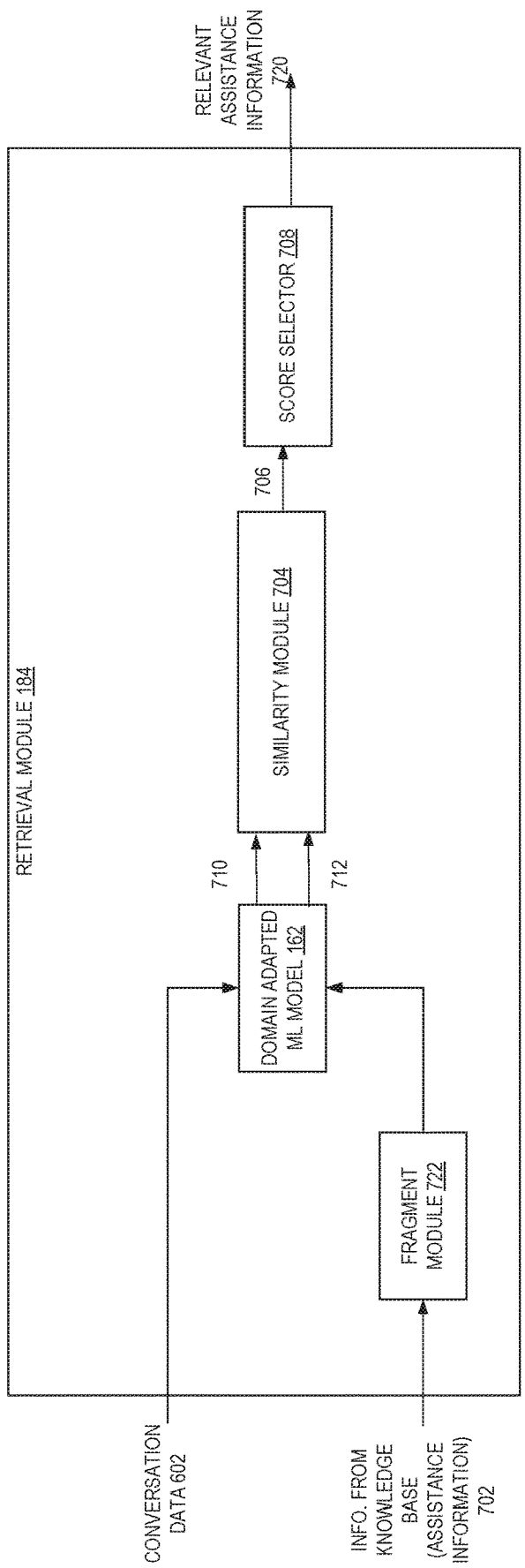
FIG. 7 is a block diagram of a deployed retrieval module, in accordance with one or more embodiments.

FIG. 7 is a block diagram of a deployed retrieval module 184, in accordance with one or more embodiments. The retrieval module 184 includes the domain adapted ML model 162 described with reference to FIG. 3, trained to learn features of embedded information originating in different domains (e.g., conversation data and assistance information) associated with word overlapping and semantic matching. The retrieval module 184 may also include a fragment module 722, a similarity module 704, and a score selector 708. However, it should be appreciated that such modules (e.g., fragment module 722, similarity module 704, score selector 708) may be implemented by the model hosting system 140, the provider network 100, or some other service. As shown, the retrieval module 184 is configured to receive conversation data 602 satisfying the trigger threshold from the trigger module 182. As described herein, the conversation data 602 received from the trigger module 182 may be any portion of a conversation such as a turn, a sentence, one or more words, an utterance, candidates, etc. The retrieval module 184 is also configured to receive information from knowledge base 106 (or assistance information) 702.

In some implementations, the domain adapted ML model 162 encodes all of the assistance information 702. In other implementations, the fragment module 722 is deployed to partition the assistance information 702 into fragments. For example, the fragment module 722 may be deployed responsive to the assistance information 702 being a different size than a size of the conversation data. Additionally or alternatively, the fragment module 722 may be deployed responsive to the assistance information 702 satisfying a size limit (e.g., the assistance information 702 may be a long document). The size limit may be based on an amount of information loss when the assistance information is embedded by the domain adapted ML model 162. In some embodiments, this size limit is manually determined. In other embodiments, the size limit is a hyperparameter optimized during training.

To preserve the data of the assistance information 702, the fragment module 722 partitions the assistance information 702 into fragments, where each fragment is a fixed size (e.g., a predetermined number of sentences, a predetermined number of characters, etc.). The size of the fragments determined by the fragment module 722 may be predetermined and/or determined by optimizing hyper-parameters during training.

The fragment module 722 is configured to create document fragments using a window and stride. As described herein, a window defines a number of sentences (or words or the like) that are included in a fragment, and a stride defines a number of sentences (or words or the like) that are skipped between consecutive fragments. The window may be a predetermined window size $W_d$, and the stride may be a predetermined stride size Sa.

In some embodiments, the fragment module 722 is configured to maintain semantic boundaries in the assistance information. Instead of parsing n sentences into one fragment, the fragment module 722 considers contextual information. In a non-limiting example, a title provides contextual information as the title describes subsequent sentences. As such, the fragment module 722 identifies titles as unique fragments.

In some embodiments, after the retrieval module 184 is trained (e.g., at circle (9) in FIG. 1), the retrieval module 184 is executed to precompute knowledge base embeddings. In these implementations, the fragment module 722 may be applied such that information is not lost during the encoding of the knowledge base. That is, the assistance information may be fragmented using the fragment module 722 and fed to the domain adapted ML model 162, resulting in encoded assistance information (e.g., embedded knowledge base data 136 in FIG. 1).

The fragment module 722 may partition a document into multiple sections (e.g., paragraphs) and further into multiple fragments. Each fragment is fed to the domain adapted ML model 162 to be transformed into a fragment embedding. The similarity of the trigger utterance to the document may be determined by algorithmically combining each of the fragments of the section and determining the similarity of the trigger embedding with respect to each fragment. Mathematically, this relationship is described in Equation (3) below:

$$R = \max_{(i,j)} R_{ij} \quad (3)$$

where $$R_{ij} = <Q, F_{ij}>$$

In Equation (3) above, R represents the query-document relevance. Each section of a document S includes Na fragments. The embedding of the $j^{th}$ fragment in the $i^{th}$ section is $F_{ij}$, where i=1, 2, .... S and j=1, 2, .... $N_i$. The relevance between the embedded fragments of a document $F_{ij}$ and an embedded trigger utterance Q (or other embedded portion of conversation data) is denoted as $R_{ij}$, where $R_{ij}$ is determined by taking the inner product of Q, and $F_{ij}$. Equation (3) illustrates a similarity determination based on fragment-level relevance of one or more documents to the conversation data.

In some cases, determining the similarity based on section-level relevance of one or more documents and the conversation data results in a more accurate similarity analysis of the relevance of the document and the conversation data. For example, sections in a document generally focus on one specific topic such. Accordingly, comparing the topics of each section to the conversation data results in a more accurate similarity determination than comparing sentences (or other fragments) of each section to the conversation data.

Equation (4) illustrates a section-level relevance:

$$Y_{ij} = \max_{(i,j)} <Q, S_i> \quad (4)$$

where $$S_i = \sum_{j=1}^{N_i} w_{ij} F_{ij}$$

$$w_{ij} = \frac{e^{R_{ij}/T}}{\sum_{j=1}^{N_i} e^{R_{ij}/T}}$$

In Equation (4) above, the section embedding $S_i$ is a weighted sum of the fragment embeddings partitioned from that section $F_{ij}$. The weighting of each fragment $w_{ij}$ is determined using the similarity $R_{ij}$ of each embedded fragment to an embedded trigger utterance (or other embedded portion of conversation data). The weighting is normalized by softmax with "temperature" T, which is a non-negative real parameter that influences an output probability distribution. The temperature is a hyperparameter that may be tuned during training. As T increases, the section embedding approaches the average fragment embedding. In contrast, as T decreases, the section embedding approaches the most relevant fragment embedding. The section level relevance is defined as the maximum value of the inner product of a embedded trigger utterance Q (or other embedded portion of conversation data) to each section embedding $S_i$.

Referring still to FIG. 7, the domain adapted ML model 162 embeds each input 602 and 702, resulting in two different fixed-dimension embeddings 710 and 712. In some embodiments, the domain adapted ML model 162 embeds each input 602 and 702 in real time (e.g., during a conversation between two users such as customer service agents and customers). In other embodiments, the domain adapted ML model 162 precomputes embeddings 712 and retrieves such embeddings from the storage service 116. As described herein, embedding 710 is referred to as an embedded trigger utterance and embedding 712 is referred to as an embedded document. However, it should be appreciated that embedding 710 may be any embedded portion of conversation data 602 and that embedding 712 may be any embedded assistance information (or a fragment, sentence, section, etc. of assistance information).

Each of the embeddings 710 and 712 are passed to a similarity module 704 to evaluate the similarity of the two embeddings. The similarity of the two embeddings is represented via similarity score 706. The similarity module 704 determines similarity using any suitable relevance ranking algorithm or other algorithm. For example, in some embodiments, the similarity module 704 is configured to compute the cosine similarity between the embeddings. In other embodiments, the similarity module 704 may be a neural network trained to rank the similarity of embeddings 710 and 712. The embeddings 710 and 712 may be concatenated and the similarity module 704 (e.g., a neural network) determines a similarity of the embeddings as similarity score 706. In particular, feedback may be received from a user (such as a customer service agent) in the form of a relevance ranking of assistance information. This feedback is used in a supervised learning scheme to refine the ranking (or the similarity of embeddings 710 and 712) determined by the similarity module.

Figure 8:
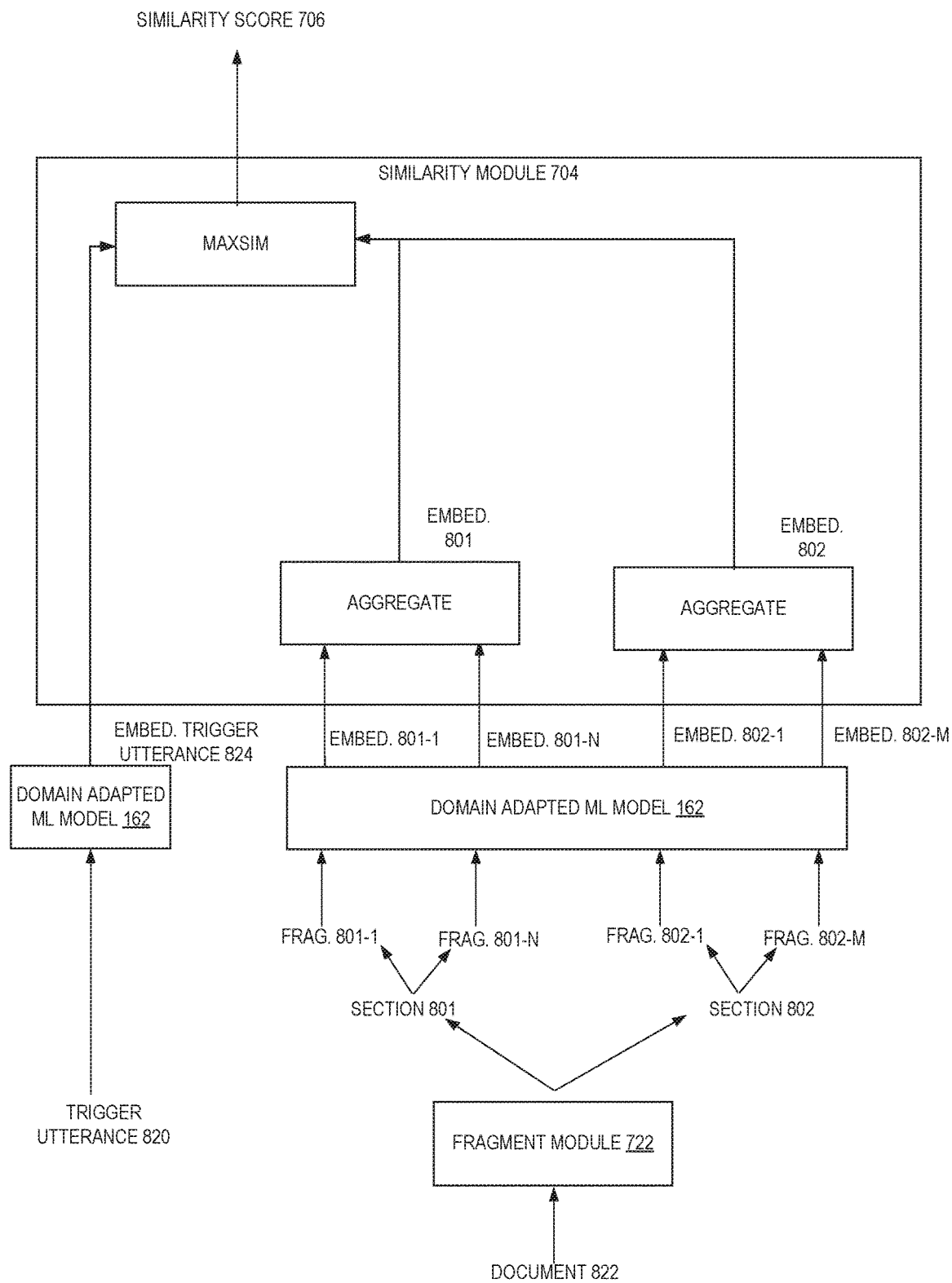
FIG. 8 illustrates an example of a fragment module, a domain adapted machine learning model, and a similarity module' operating on a single document and a single trigger utterance, in accordance with one or more embodiments.

FIG. 8 illustrates an example of the fragment module 722, the domain adapted ML model 162, and the similarity module 704 operating on a single document and a single trigger utterance, in accordance with one or more embodiments. While the similarity between a trigger utterance and a long document is shown, it should be appreciated that the similarity between any other portion of conversation data and any other assistance information can be determined.

As shown, the domain adapted ML model 162 is configured to receive trigger utterance 820 and document 822. However, the fragment module 722 determines that document 822 satisfies a size limit. That is, document 822 is too long and encoding such a long document 822 would result in information loss. Accordingly, the fragment module 722 partitions the document into sections (e.g., section 801 and section 802). It should be appreciated that while two sections are shown, the fragment module 722 may partition the document into any number of sections. The fragment module 722 further partitions the sections into fragments associated with each section. For example, fragment 1 to fragment N associated with section 1 (e.g., FRAG. 801-1 to FRAG. 801-N), and fragment 1 to fragment M (e.g., FRAG. 802-1 to FRAG. 802-M) associated with section 2.

The domain adapted ML model 162 subsequently embeds each of the fragments 801-1:801-N and 802-1:802-M and the trigger utterance 802. As a result, embedded trigger utterance 824 and embedded fragments 801-1:801-N and 802-1:802-M are passed to the similarity module 704. As shown, the similarity module 704 is configured to algorithmically combine each fragment of a section. For example, the similarity module 704 aggregates each of the embedded fragments 801-1:801-N of section 1, resulting in embedded 801 associated with section 1 (e.g., section 801). Similarly, the similarity module 704 aggregates each of the embedded fragments 802-1:802-M of section 2, resulting in embedded 802 associated with section 2 (e.g., section 802). The similarity module 704 determines the section that is most similar to the trigger utterance by determining a maximum similarity score between each of the embeddings associated with each section of the document (e.g., embedding 801 and embedding 802) and the embedded trigger utterance. The maximum similarity score is representative of the similarity of the trigger utterance 820 to the document 822. The maximum similarity score is passed to the score selector 708 as the similarity score 706. In operation, the similarity module 704 determines the section that is most similar to the trigger utterance by determining a maximum cosine similarity (or other similarity measure, such as an output of a neural network) between embedded 801, embedded 802, and the embedded trigger utterance 824.

In alternate embodiments, embedding 801 and embedding 802 are algorithmically combined (e.g., using max pooling or a weighted average) and the similarity module 704 determines the similarity between the embedded trigger utterance 824 and the algorithmically combined embeddings.

Returning back to FIG. 7, the similarity score 706 is passed to the score selector 708. The score selector 708 stores the similarity score 706 as the similarity module 704 compares the same embedded trigger utterance to various other embedded documents, generating various similarity scores 706. Responsive to a number of similarity scores determined (e.g., a number of documents evaluated), after a certain amount of time has elapsed, after a received input from a user such as a customer service agent requesting assistance, etc., the score selector 708 selects a most relevant embedded document to the embedded trigger utterance by identifying a highest similarity score of the stored similarity scores. Accordingly, the score selector 708 identifies the document associated with the highest similarity score 706 as relevant the most relevant document to the trigger utterance (e.g., relevant assistance information 720).

In some embodiments, the score selector 708 is configured to select a top-k highest similarity scores using the k nearest neighbor algorithm. In these embodiments, the score selector 708 identifies the top-k most relevant documents to the trigger utterance. Accordingly, the score selector 708 determines a subset including the top-k most relevant assistance information. As described herein, k is a manually determined parameter that adjusts the amount of assistance provided to a user (e.g., a number of documents provided to a customer service agent).

Referring back to FIG. 5, the retrieval module 184 transmits the relevant assistance information (or the subset of relevant assistance information) to the compute device 122 of user 118B at circle (6). For example, the retrieval module 184 transmits the relevant assistance information to a computing device of an agent. In other embodiments, the retrieval module 184 transmits an identifier identifying the relevant assistance information (or the subset of the relevant assistance information) to the compute device 122. For example, the retrieval module 184 may transmit a storage location of the assistance information in the knowledge base 106, a URL, and the like. The relevant assistance information is presented for display to user 118B (e.g., an agent) via a user interface of the compute device 122. In some embodiments, at circle (7), the retrieval module 184 receives feedback from the user 118B via the compute device 122.

Figure 9:
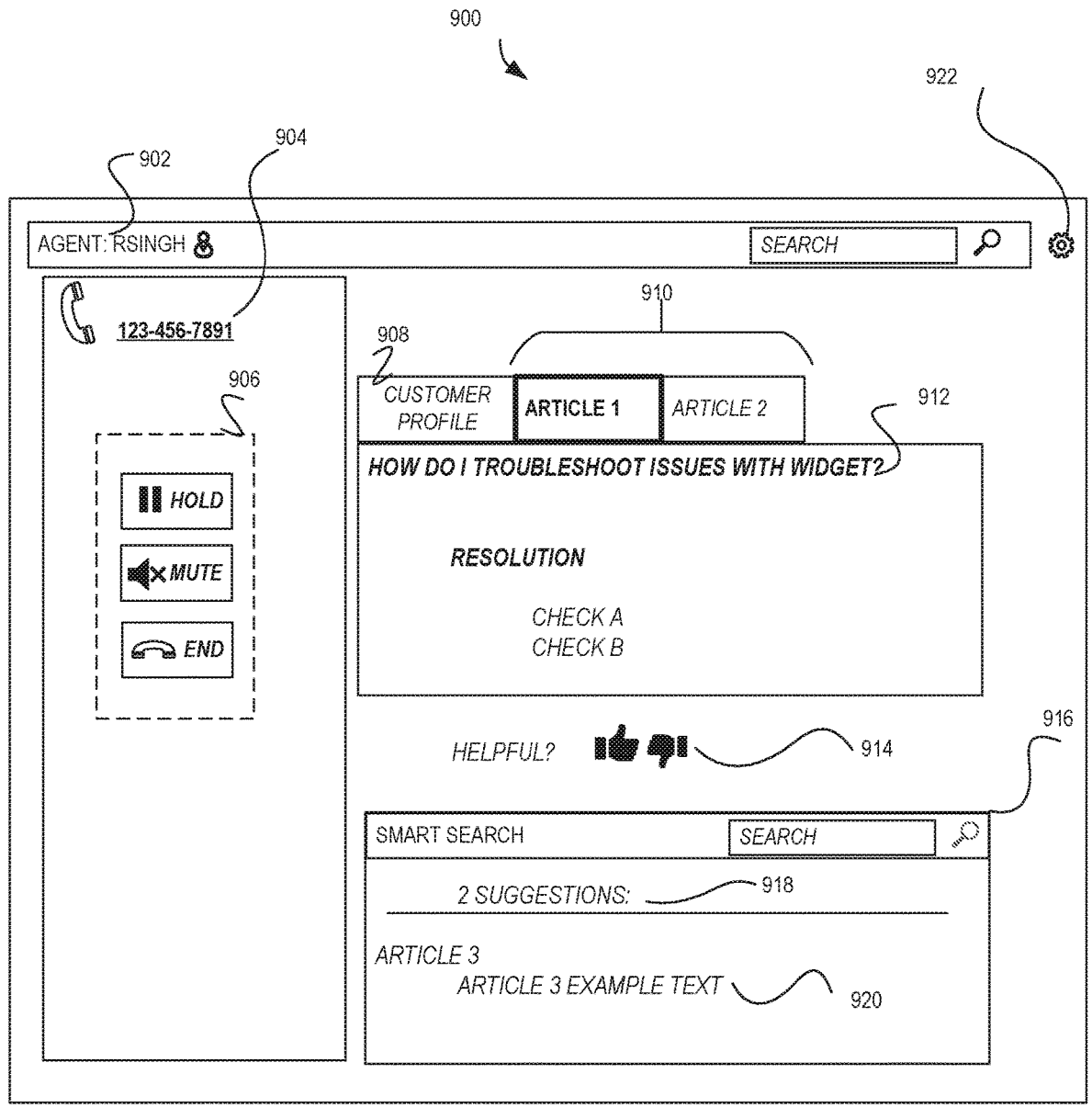
FIG. 9 illustrates an example user interface displayed on the compute device, in accordance with one or more embodiments.

FIG. 9 illustrates an example user interface displayed on the compute device, in accordance with one or more embodiments. One or more services of the provider network 100 is configured to generate, manager, monitor, and/or update the displayed user interface. In some implementations, the conversation manager 132 is configured to manage the user interface. The user interface 900 is displayed on a compute device 122 of a user 118 associated with the organization 124 (e.g., customer service agent user 118B communicating with customer user 118C of a third-party network).

As shown at 902, the user interface 900 displays a user identifier (e.g., an agent identifier). Such user identifier identifies user 118B associated with the organization 124. The user identifier may be a first name, a last name, a user ID number, a pseudonym, an abbreviation, or some combination.

At 904, the user interface 900 displays a third-party identifier. Such third-party identifier identifies a user associated with a third-party network (e.g., user 118C associated with third party network 126). The third-party identifier may be a telephone number, an email address, a user name, a user ID, a third party identifier (e.g., information about the third-party network 126), an abbreviation, or some combination.

At 906, the user interface 900 displays communication controls. Such communication controls may pause the communication (e.g., put a customer on hold), mute the communication, end the communication, merge the communication (e.g., merge a telephone call with a different agent and/or admin of the organization 124), and the like.

At 908, the user interface 900 displays customer profile information. In some embodiments, the conversation manager 132 monitors the communication between users and queries one or more databases for profile information. For example, given the third-party identifier (e.g., retrieved when the compute device 122 associated with the third-party network establishes a communication link with the contact center service 180), the conversation manager 132 determines customer profile information such as a first name, a last name, a birth date, a previous communication history, compute device 122 information (e.g., a model number, carrier information), and the like. In some embodiments, the customer profile information is editable such that an agent can take notes about the communication, edit recalled customer profile information, and the like.

At 910, the user interface 900 displays a top-k relevant assistance information (e.g., relevant assistance information 720 determined by the retrieval module 184 with reference to FIG. 7). Assistance information may be previewed, as shown at 912.

At 914, the user interface 900 displays feedback buttons. While feedback buttons are shown as "thumb" buttons that are clicked on, feedback buttons may also include a feedback slider (e.g., a displayed feedback scale ranging from not relevant (or helpful) to relevant (or helpful) via words, numbers, gestures, and the like). A user such as an agent presented the user interface 900 may explicitly evaluate the relevance of the top-k assistance information by interacting with such feedback buttons 914. Such selected values (e.g., feedback) is captured by the conversation manager 132 and may be used to modify the score selector 708.

A user such as an agent may also implicitly evaluate the relevance of the top-k assistance information. For example, the conversation manager 132 may track the time a user spends reviewing an article by tracking the pupils of the user's eye. The more time that the user (e.g., the agent) spends reviewing an article, the more relevant the article is to the communication. The conversation manager 132 may receive such tracking data using cameras or other sensors. Additionally or alternatively, the conversation manager 132 may interpret the user's selection of assistance information from a subset of assistance information to mean that the selected assistance information is more relevant. For example, if a user (e.g., a customer service agent) selects "Article 2" instead of "Article 1," the user is implicitly providing feedback to the conversation manager 132 that "Article 2" is more relevant to the communication than "Article 1." Accordingly, such received values are used to modify the score selector 708.

A user such as an agent may enter a search for relevant assistance information at 916. In operation, the trigger module 182 of the conversation manager 132 is bypassed. As such, the trigger utterance is the one or more words searched by the agent at 916. The retrieval module 184 determines the top-k most relevant assistance information using an encoded representation of the search term. As shown at 918, the retrieval module 184 may identify multiple suggestions/recommendations. Moreover, the user interface 900 may preview the identified suggestions/recommendations at 920.

A user such as an agent may configure assistance preferences by interacting with the button at 922. The assistance preferences are described with reference to FIG. 10.

Figure 10:
FIG. 10 illustrates an example user interface of the compute device, in accordance with one or more embodiments.

FIG. 10 illustrates an example user interface of the compute device, in accordance with one or more embodiments. At 1002 of user interface 1000 displayed to the user, the user such as an agent may configure a frequency of assistance. The frequency of assistance regulates how much assistance is recommended to the user (e.g., the agent). In operation, the trigger module 182 is modified by adjusting the frequency of assistance. Specifically, the trigger threshold used by the comparator module is based on the frequency of assistance determined by the user such as the agent configuring the frequency of assistance at 1004.

At 1004, the user such as the agent adjusts the frequency of assistance. In some embodiments, the user selects assistance recommendations from a numerical range, a text range, and the like. In response to a user selection, the conversation manager 132 maps the user selection to the trigger threshold. For example, the conversation manager 132 maps the user selection to the trigger threshold according to a predefined mapping table. For example, a user selection of "somewhat" maps to a trigger threshold of 0.5. In other embodiments, the user (e.g., agent) is displayed the trigger threshold at 1004 and the user adjusts the trigger threshold directly.

At 1006 of user interface 1000 displayed to the user (such as the agent), the user may configure a number of provided assistance documents. The number of provided assistance documents regulates the number of assistance information recommended to the user (e.g., the agent). In operation, the retrieval module 184 is modified by adjusting the number of provided assistance documents. Specifically, the k of the top-k similarity scores selected by the score selector 708 is based on the number of provided assistance documents determined by the user (e.g., the agent).

At 1008, the user (e.g., the agent) adjusts the number of provided assistance documents. The user may select a number from a drop-down menu, enter a number into a text box, select a button representative of a number, slide a scale, and the like, to adjust the number of provided assistance documents.

The conversation manager 132 is configured to monitor explicit or implicit feedback regarding the relevance of the assistance information. In particular, the retrieval module 184 is modified because the retrieval module 184 is responsible for selecting relevant assistance information. Referring back to FIG. 7, the score selector 708 modifies how it selects the relevant assistance information based on the similarity scores determined by the similarity module 704.

In a non-limiting example, the score selector 708 is configured to select, as the most relevant assistance information, the assistance information associated with the highest similarity score. Such assistance information is "Article 1" illustrated in FIG. 9. "Article 2" is also displayed on the user interface 900 because "Article 2" is associated with the second highest similarity score. However, responsive to receiving feedback that the user (such as the customer service agent) identified different assistance information as being the most relevant assistance information (e.g., the conversation manager 132 received an input that the user selected "Article 2" instead of "Article 1"), then the score selector 708 selects the second highest similarity score as being the most relevant assistance information. In operation, the score selector 708 rescores the similarity scores using weights/biases, clustering similarity scores, learning to rank loss (determined using feedback), and the like. That is, the assistance information is ranked high or lower for a future assistance information selection based on the explicit or implicit feedback. Rescoring the score selector 708 improves the performance upper bound of the retrieval module 184 using indirect supervision (e.g., the feedback received from users such as agents during runtime).

In some embodiments, the score selector 708 tunes the relevant assistance specific to particular users (e.g., agents). For example, the score selector 708 only selects the second highest similarity score as the most relevant assistance information for a first customer service agent. In contrast, the score selector 708 continues to select the highest similarity score as the most relevant assistance information for a second customer service agent. In some embodiments, the score selector 708 tunes the relevant assistance specific to particular organizations 124, different geographies of users of the organization 124, different ages of users of the organization 124, and the like.

In some embodiments, the conversation manager 132 tunes the score selector 708 responsive to measuring an average user selection. For example, the conversation manager 132 measures how many times the user (such as an agent) explicitly or implicitly selects "Article 2" instead of "Article 1." In these embodiments, the conversation manager 132 passes such feedback to the retrieval module 184 responsive to the user feedback satisfying a rescoring threshold.

In a non-limiting example, the rescoring threshold for rescoring the scorer module 708 is 50%. If a customer service agent implicitly or explicitly selects "Article 2" instead of "Article 1" six times out of every 10 recommended assistance information, then the conversation manager passes such feedback to the scorer module 708 and the scorer module 708 rescores the most relevant information. That is, 60% of the assistance information was corrected, satisfying the rescoring threshold of 50%. In contrast, if the customer service agent implicitly or explicitly selects "Article 2" instead of "Article 1" two times out of every 10 recommended assistance information, then the conversation manager 132 does not pass such feedback to the scorer module 708 because the rescoring threshold is not satisfied. That is, 20% of the assistance information was corrected, which does not satisfy the rescoring threshold of 50%.

Figure 11:
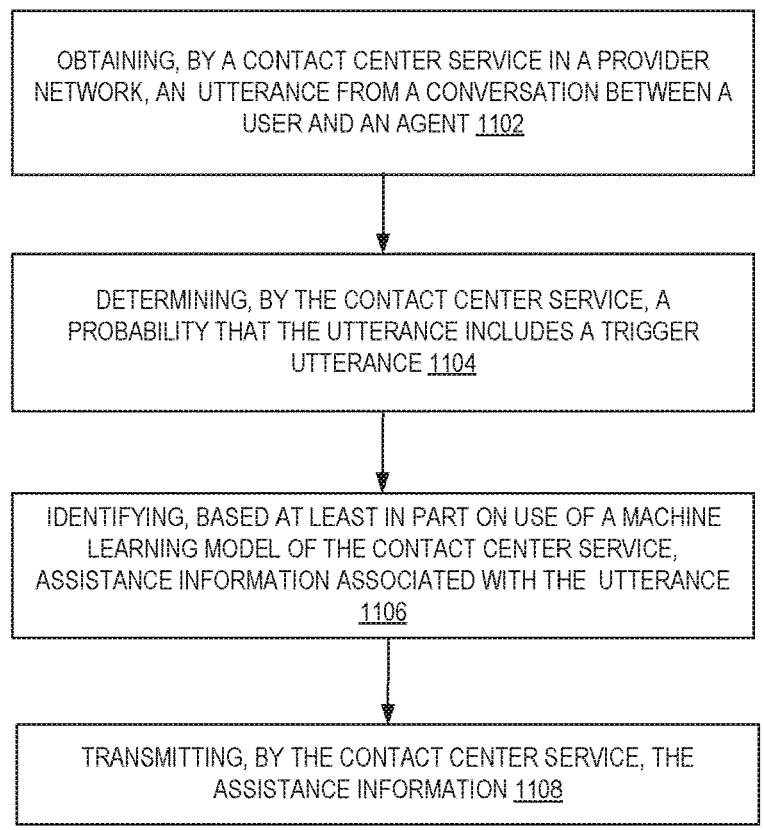
FIG. 11 is a flow diagram illustrating operations of a method for detecting a user's needs and providing real time assistance, in accordance with one or more embodiments.

FIG. 11 is a flow diagram illustrating operations 1100 of a method for detecting a user's needs and providing real time assistance, in accordance with one or more embodiments. Some or all of the operations 1100 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1100 are performed by the contact center service of the other figures. The operations 1100 may be performed with fewer or more blocks than those blocks shown. Moreover, the operations 1100 may be performed in differing orders than the order of the blocks shown.

The operations 1100 include, at block 1102, obtaining, by a contact center service in a provider network, an utterance from a conversation between a user and an agent. As described herein, a conversation is an iterative interaction between at least two users. Each interaction of the conversation is a turn. The turn can be parsed into utterances such as a single sentence spoken by the user or the agent.

The operations 1100 further include, at block 1104, determining, by the contact center service, a probability that the utterance includes a trigger utterance. A trigger utterance is specific type of utterance triggering a need for assistance. As described herein, a triggered need for assistance is based on identifying a driver (e.g., an intent) associated with a speaker's need for assistance, a type of assistance, a particular product/service, an action (such as a remediation action), and/or information pertaining to assistance. For instance, a driver identifies a particular widget at issue (e.g., a particular widget that a customer (or other user) needs assistance with) and/or an action item associated with a customer service agent (or other user). A machine learning model may be trained to predict a probability of identifying trigger utterances (e.g., whether an utterance includes a driver) using a fine-tuned domain adapted MPNET model trained using contrastive learning and a fine-tuned domain adapted DeCLUTR model trained using TSDAE.

The MPNET model and the DECLUTR model may be stacked as a dual encoder stacked ensemble model.

The operations 1100 further include, at block 1106, identifying, based at least in part on use of a machine learning model, of the contact center service, assistance information associated with the utterance. The machine learning model may be configured to perform at least two tasks to identify and retrieve relevant assistance information. For example, the machine learning model is trained to identify semantic relatedness between two inputs, and identify term overlap between two inputs. The machine learning model employs multi-task learning to train a single model to perform two related tasks. The machine learning model is trained to identify semantic relatedness using contrastive learning, and identify term overlap using TSDAE. Accordingly, the machine learning model is configured to identify semantically related assistance information (e.g., documents) and/or relevant term overlapping assistance information based on the utterance and assistance information.

The operations 1100 further include, at block 1108, transmitting, by the contact center service, the assistance information. Additionally or alternatively, the contact center service may transmit an identifier of the assistance information. As described herein, assistance information that is most similar to the utterance is identified by comparing similarity scores of assistance information and the utterance. A highest similarity score is representative of assistance information that is most relevant to the utterance. As such, the assistance information is transmitted to a user device (such as a customer service agent computing device) to provide assistance to the user in real time.

Figure 12:
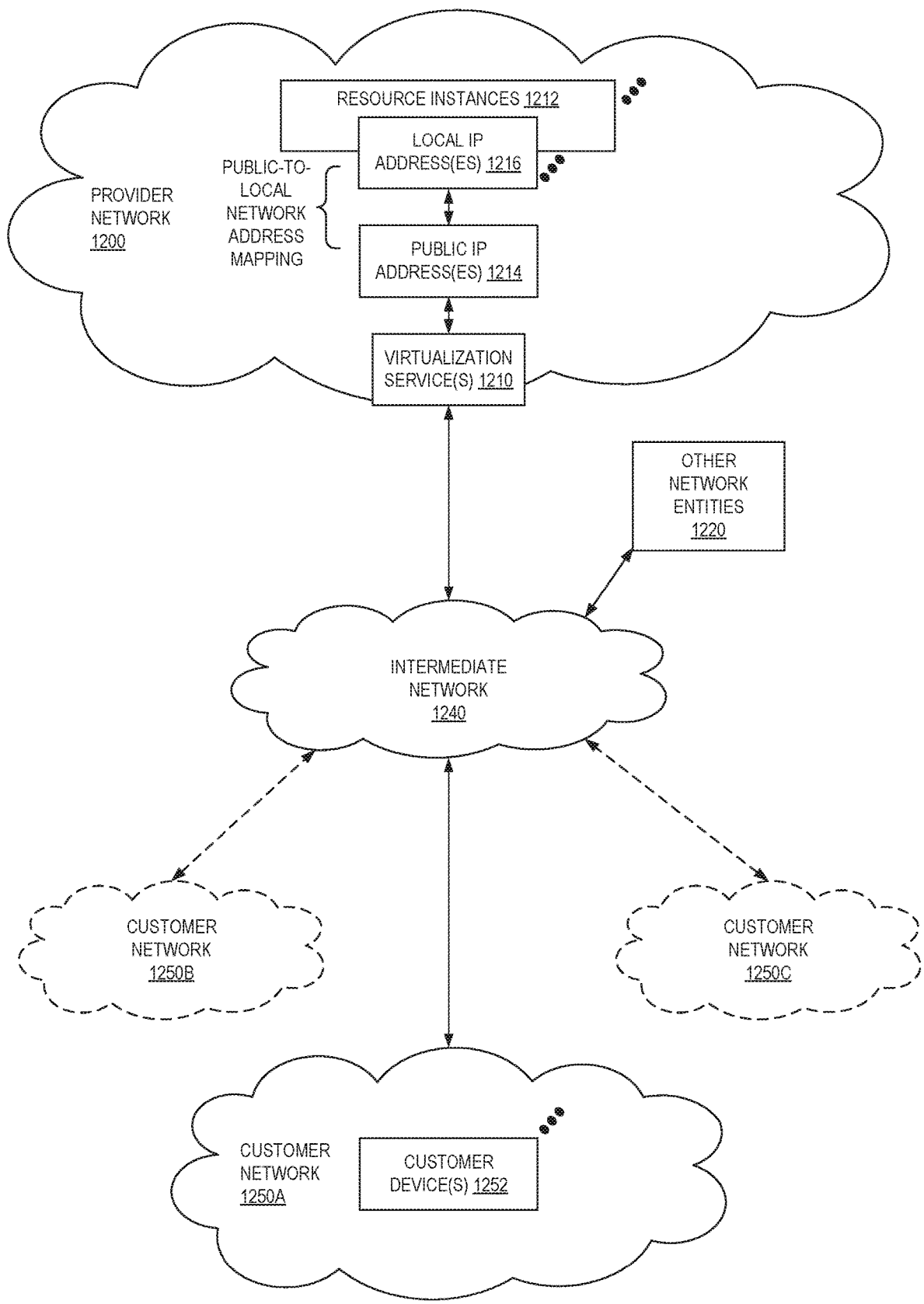
FIG. 12 illustrates an example provider network, in accordance with one or more embodiments.

FIG. 12 illustrates an example provider network (or "service provider system") environment, in accordance with one or more embodiments. A provider network 1200 can provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 can be associated with the resource instances 1212; the local IP addresses are the internal network addresses of the resource instances 1212 on the provider network 1200. In some examples, the provider network 1200 can also provide public IP addresses 1214 and/or public IP address ranges (e.g., Internet Protocol version 4 (IPv4) or Internet Protocol version 6 (IPv6) addresses) that customers can obtain from the provider 1200.

Conventionally, the provider network 1200, via the virtualization services 1210, can allow a customer of the service provider (e.g., a customer that operates one or more customer networks 1250A-1250C (referred to herein as "client networks") including one or more customer device(s) (or compute devices) 1252) to dynamically associate at least some public IP addresses 1214 assigned or allocated to the customer with particular resource instances 1212 assigned to the customer. The provider network 1200 can also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of the customer network(s) 1250A-1250C can, for example, implement customer-specific applications and present the customer's applications on an intermediate network 1240, such as the Internet. Other network entities 1220 on the intermediate network 1240 can then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 can be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1200; a customer can then assign their allocated public IP addresses to particular resource instances allocated to the customer. These public IP addresses can be referred to as customer public IP addresses, or simply customer IP addresses. Instead of being assigned by the provider network 1200 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
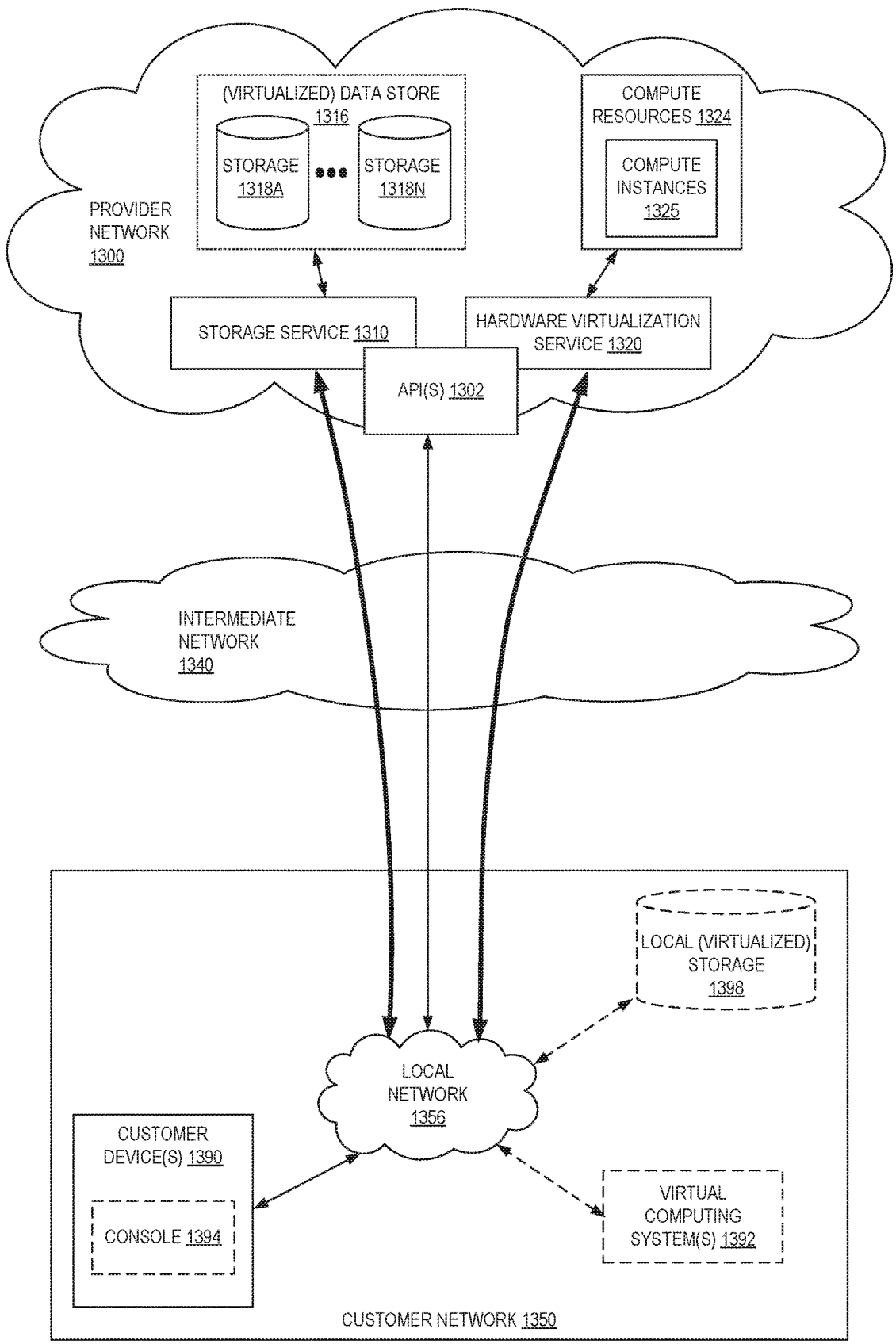
FIG. 13 is a block diagram of an example provider network that provides a storage service and a hardware virtualization service to customer, in accordance with one or more embodiments.

FIG. 13 is a block diagram of an example provider network environment that provides a storage service and a hardware virtualization service to customers, in accordance with one or more embodiments. A hardware virtualization service 1320 provides multiple compute resources 1324 (e.g., compute instances 1325, such as VMs) to customers. The compute resources 1324 can, for example, be provided as a service to customers of a provider network 1300 (e.g., to a customer that implements a customer network 1350). Each computation resource 1324 can be provided with one or more local IP addresses. The provider network 1300 can be configured to route packets from the local IP addresses of the compute resources 1324 to public Internet destinations, and from public Internet sources to the local IP addresses of the compute resources 1324.

The provider network 1300 can provide the customer network 1350, for example coupled to an intermediate network 1340 via a local network 1356, the ability to implement virtual computing systems 1392 via the hardware virtualization service 1320 coupled to the intermediate network 1340 and to the provider network 1300. In some examples, the hardware virtualization service 1320 can provide one or more APIs 1302, for example a web services interface, via which the customer network 1350 can access functionality provided by the hardware virtualization service 1320, for example via a console 1394 (e.g., a web-based application, standalone application, mobile application, etc.) of a customer device 1390. In some examples, at the provider network 1300, each virtual computing system 1392 at the customer network 1350 can correspond to a computation resource 1324 that is leased, rented, or otherwise provided to the customer network 1350.

From an instance of the virtual computing system(s) 1392 and/or another customer device 1390 (e.g., via console 1394), the customer can access the functionality of a storage service 1310, for example via the one or more APIs 1302, to access data from and store data to storage resources 1318A-1318N of a virtual data store 1316 (e.g., a folder or "bucket," a virtualized volume, a database, etc.) provided by the provider network 1300. In some examples, a virtualized data store gateway (not shown) can be provided at the customer network 1350 that can locally cache at least some data, for example frequently accessed or critical data, and that can communicate with the storage service 1310 via one or more communications channels to upload new or modified data from a local cache so that the primary store of data (the virtualized data store 1316) is maintained. In some examples, a user, via the virtual computing system 1392 and/or another customer device 1390, can mount and access virtual data store 1316 volumes via the storage service 1310 acting as a storage virtualization service, and these volumes can appear to the user as local (virtualized) storage 1398.

While not shown in FIG. 13, the virtualization service(s) can also be accessed from resource instances within the provider network 1300 via the API(s) 1302. For example, a customer, appliance service provider, or other entity can access a virtualization service from within a respective virtual network on the provider network 1300 via the API(s) 1302 to request allocation of one or more resource instances within the virtual network or within another virtual network.

Illustrative Systems

Figure 14:
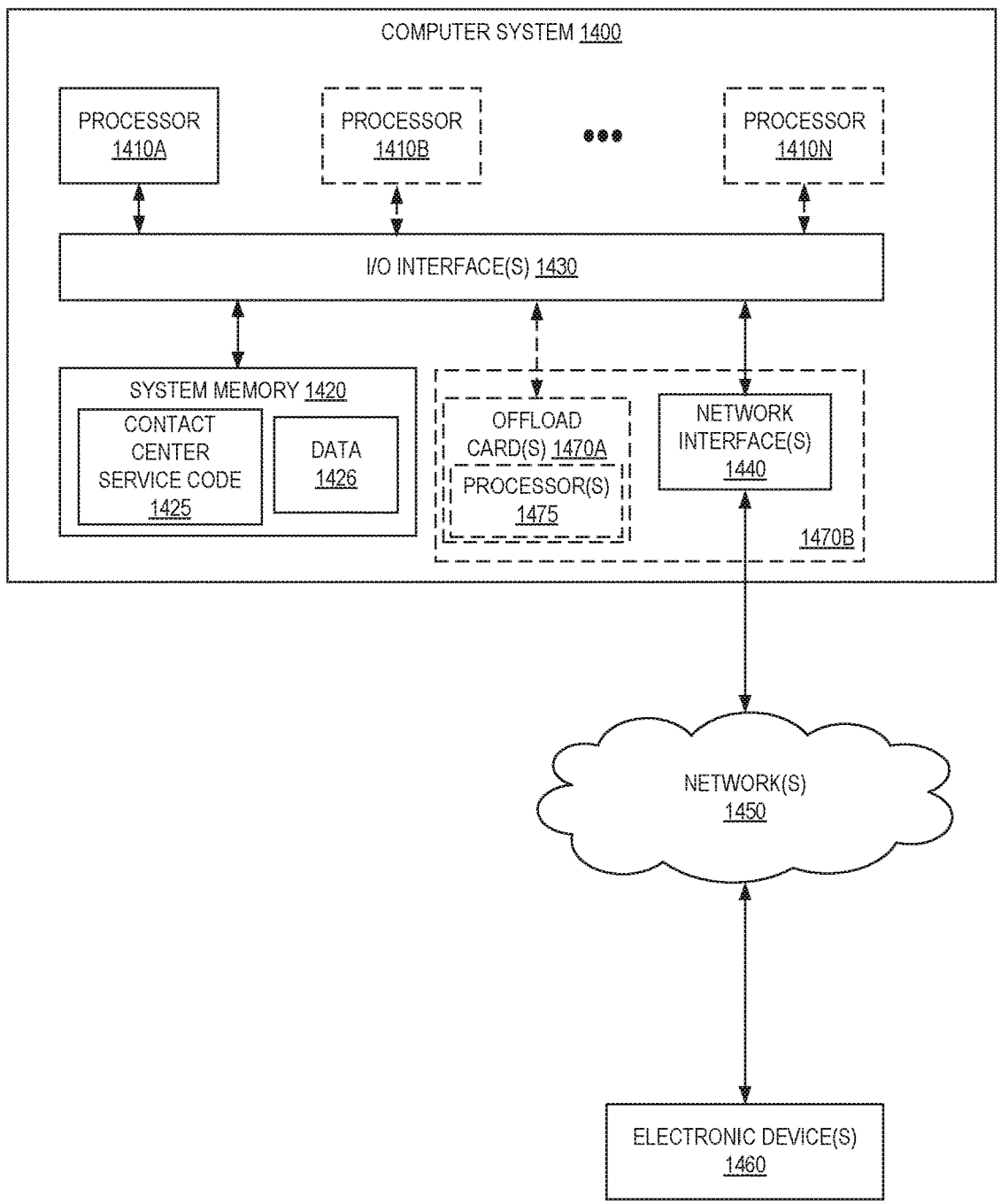
FIG. 14 is a block diagram illustrating an example computer system that can be used in some embodiments.

In some examples, a system that implements a portion or all of the techniques described herein can include a general-purpose computer system, such as the computer system 1400 (referred to herein as compute device) illustrated in FIG. 14, that includes, or is configured to access, one or more computer-accessible media. In the illustrated example, the computer system 1400 includes one or more processors 1410 coupled to a system memory 1420 via an input/output (I/O) interface 1430. The computer system 1400 further includes a network interface 1440 coupled to the I/O interface 1430. While FIG. 14 shows the computer system 1400 as a single computing device, in various examples the computer system 1400 can include one computing device or any number of computing devices configured to work together as a single computer system 1400.

In various examples, the computer system 1400 can be a uniprocessor system including one processor 1410, or a multiprocessor system including several processors 1410 (e.g., two, four, eight, or another suitable number). The processor(s) 1410 can be any suitable processor(s) capable of executing instructions. For example, in various examples, the processor(s) 1410 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1410 can commonly, but not necessarily, implement the same ISA.

The system memory 1420 can store instructions and data accessible by the processor(s) 1410. In various examples, the system memory 1420 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1420 as contact center service code 1425 (e.g., executable to implement, in whole or in part, the contact center service 180) and data 1426.

In some examples, the I/O interface 1430 can be configured to coordinate I/O traffic between the processor 1410, the system memory 1420, and any peripheral devices in the device, including the network interface 1440 and/or other peripheral interfaces (not shown). In some examples, the I/O interface 1430 can perform any necessary protocol, timing, or other data transformations to convert data signals from one component (e.g., the system memory 1420) into a format suitable for use by another component (e.g., the processor 1410). In some examples, the I/O interface 1430 can include support for devices attached through various types of peripheral buses, such as a variant of the Peripheral Component Interconnect (PCI) bus standard or the Universal Serial Bus (USB) standard, for example. In some examples, the function of the I/O interface 1430 can be split into two or more separate components, such as a north bridge and a south bridge, for example. Also, in some examples, some or all of the functionality of the I/O interface 1430, such as an interface to the system memory 1420, can be incorporated directly into the processor 1410.

The network interface 1440 can be configured to allow data to be exchanged between the computer system 1400 and other devices 1460 attached to a network or networks 1450, such as other computer systems or devices as illustrated in FIG. 1, for example. In various examples, the network interface 1440 can support communication via any suitable wired or wireless general data networks, such as types of Ethernet network, for example. Additionally, the network interface 1440 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1400 includes one or more offload cards 1470A or 1470B (including one or more processors 1475, and possibly including the one or more network interfaces 1440) that are connected using the I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1400 can act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some examples the offload card(s) 1470A or 1470B can perform compute instance management operations, such as pausing and/or un-pausing compute instances, launching and/or terminating compute instances, performing memory transfer/copying operations, etc. These management operations can, in some examples, be performed by the offload card(s) 1470A or 1470B in coordination with a hypervisor (e.g., upon a request from a hypervisor) that is executed by the other processors 1410A-1410N of the computer system 1400. However, in some examples the virtualization manager implemented by the offload card(s) 1470A or 1470B can accommodate requests from other entities (e.g., from compute instances themselves), and cannot coordinate with (or service) any separate hypervisor.

In some examples, the system memory 1420 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1400 via the I/O interface 1430. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1400 as the system memory 1420 or another type of memory. Further, a computer-accessible medium can include transmission media or signals such as electrical, electromagnetic, or digital signals, conveyed via a communication medium such as a network and/or a wireless link, such as can be implemented via the network interface 1440.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1318A-1318N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, by a contact center service in a provider network, an utterance from a conversation between a user and an agent, wherein the utterance comprises one or more sentences of the conversation;
   determining, by a first machine learning model of the contact center service, a probability that the utterance includes a trigger utterance, wherein the first machine learning model is a dual encoder stacked ensemble model trained to identify the probability of the utterance being a trigger utterance;
   responsive to determining that the probability meets or exceeds a threshold probability value, identifying, by a second machine learning model of the contact center service, assistance information associated with the utterance by determining a similarity between a representation of the utterance and a representation of the assistance information using section-level relevance of one or more documents of the assistance information to the utterance, wherein the one or more documents are divided into sections and each of the sections includes a plurality of fragments, wherein the section-level relevance uses section embeddings that are weighted sums of fragment embeddings partitioned from corresponding sections of the one or more documents, and wherein the second machine learning model is trained to determine the representation of the utterance and the representation of the assistance information; and transmitting, by the contact center service, the assistance information for presentation via a user interface.

2. The computer-implemented method of claim 1, wherein the trigger utterance identifies at least one of:
an intent associated with the user indicating at least one of a need for assistance, a type of assistance, or information pertaining to assistance,
an action of the agent,
a product, or
a service.

3. The computer-implemented method of claim 1, wherein the assistance information is an identifier associated with at least one of a website address, an email address, a telephone number, a physical address, a contact information, a template email, a refund form, or a document.

4. A computer-implemented method comprising:
obtaining, by a contact center service in a provider network, an utterance from a conversation between a user and an agent, wherein the utterance includes a plurality of sentences;
determining, by the contact center service, a probability that the utterance includes a trigger utterance, wherein determining the probability that the utterance includes the trigger utterance comprises:
determining, based at least in part on use of a first machine learning model, a probability that each sentence of the plurality of sentences includes the trigger utterance; and
selecting, by the contact center service, a sentence of the plurality of sentences associated with a highest probability that the sentence includes the trigger utterance;
identifying, based at least in part on use of a second machine learning model of the contact center service, assistance information associated with the utterance by determining a similarity between a representation of the utterance and a representation of the assistance information using section-level relevance of one or more documents of the assistance information to the utterance, wherein the one or more documents are divided into sections and each of the sections includes a plurality of fragments, and wherein the section-level relevance uses section embeddings that are weighted sums of fragment embeddings partitioned from corresponding sections of the one or more documents; and
transmitting, by the contact center service, the assistance information.

5. The computer-implemented method of claim 4, wherein the trigger utterance identifies at least one of:
an intent associated with the user indicating at least one of a need for assistance, a type of assistance, or information pertaining to assistance,
an action of the agent,
a product, or
a service.

6. The computer-implemented method of claim 4, wherein the first machine learning model is a dual encoder stacked ensemble model.

7. The computer-implemented method of claim 4, wherein identifying the assistance information includes:
identifying, by the contact center service, a plurality of assistance information;
scoring, by the contact center service, each of the plurality of assistance information; and
selecting, by the contact center service, a subset of assistance information from the plurality of assistance information to be the assistance information to be transmitted.

8. The computer-implemented method of claim 7, further comprising receiving, by the contact center service, a value identifying at least one assistance information of the subset of assistance information.

9. The computer-implemented method of claim 8, further comprising causing, by the contact center service, one or more assistance information of the subset of assistance information to be ranked higher or lower, for a future assistance information selection, based on the value.

10. The computer-implemented method of claim 4, wherein the assistance information is an identifier associated with at least one of a website address, an email address, a telephone number, a physical address, a contact information, a template email, a refund form, or a document.

11. The computer-implemented method of claim 4, wherein identifying assistance information associated with the utterance comprises comparing a representation of the utterance to a representation of assistance information.

12. The computer-implemented method of claim 4, wherein the second machine learning model is trained using a multi-task learning technique to:
generate a representation of the utterance; and
generate a representation of assistance information.

13. A system comprising:
a first one or more electronic devices to implement a model hosting system in a multi-tenant provider network; and
a second one or more electronic devices to implement a contact center service in the multi-tenant provider network, the contact center service including instructions that upon execution by one or more processors cause the contact center service to:
obtain an utterance from a conversation between a user and an agent;
determine, using a first machine learning model hosted by the model hosting system, a probability that the utterance includes a trigger utterance, wherein the first machine learning model is a dual encoder stacked ensemble model trained to determine the probability that the utterance includes the trigger utterance;
identify, based at least in part on use of a second machine learning model hosted by the model hosting system, assistance information associated with the utterance by determining a similarity between a representation of the utterance and a representation of the assistance information using section-level relevance of one or more documents of the assistance information to the utterance, wherein the one or more documents are divided into sections and each of the sections includes a plurality of fragments, and wherein the section-level relevance uses section embeddings that are weighted sums of fragment embeddings partitioned from corresponding sections of the one or more documents; and
transmit the assistance information.

14. The system of claim 13, wherein the trigger utterance identifies at least one of:
an intent associated with the user indicating at least one of a need for assistance, a type of assistance, or information pertaining to assistance, an action of the agent,
a product, or
a service.

15. The system of claim 13, wherein identifying assistance information associated with the utterance comprises comparing a representation of the utterance to a representation of assistance information.

16. The system of claim 13, wherein the second machine learning model hosted by the model hosting system is trained using a multi-task learning technique to:
   generate a representation of the utterance; and
   generating a representation of assistance information.

17. The system of claim 13, wherein the assistance information is an identifier associated with at least one of a website address, an email address, a telephone number, a physical address, a contact information, a template email, a refund form, or a document.

18. The system of claim 13, wherein identifying the assistance information includes:
   identifying a plurality of assistance information;
   scoring each of the plurality of assistance information; and
   selecting a subset of assistance information from the plurality of assistance information to be the assistance information to be transmitted.

19. The system of claim 18, wherein the instructions comprise further instructions that, upon execution by the one or more processors, further cause the contact center service to receive a value identifying at least one assistance information of the subset of assistance information.

* * * * *